US012106130B2

(12) United States Patent
Li

(10) Patent No.: US 12,106,130 B2
(45) Date of Patent: Oct. 1, 2024

(54) PAGE GUIDING METHODS, APPARATUSES, AND ELECTRONIC DEVICES

(71) Applicant: ALIPAY (HANGZHOU) INFORMATION TECHNOLOGY CO., LTD., Zhejiang (CN)

(72) Inventor: Bo Li, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 373 days.

(21) Appl. No.: 17/361,034

(22) Filed: Jun. 28, 2021

(65) Prior Publication Data
US 2022/0091864 A1    Mar. 24, 2022

(30) Foreign Application Priority Data
Sep. 23, 2020   (CN) .......................... 202011012201.5

(51) Int. Cl.
G06F 9/451      (2018.01)
G06F 3/04817    (2022.01)
(Continued)

(52) U.S. Cl.
CPC .......... G06F 9/453 (2018.02); G06F 3/04817 (2013.01); G06F 3/04842 (2013.01); G06F 3/167 (2013.01)

(58) Field of Classification Search
CPC ................. G06F 9/453; G06F 3/04817; G06F 3/04842; G06F 3/167
See application file for complete search history.

(56) References Cited
U.S. PATENT DOCUMENTS 5,825,356 A * 10/1998 Habib .................... G06F 9/453
                                                      715/712
6,085,184 A *  7/2000 Bertrand ................. G09B 7/04
                                                      706/45
6,092,043 A *  7/2000 Squires ................. G09B 19/04
                                                      704/251
(Continued)

FOREIGN PATENT DOCUMENTS

CN    104951313      9/2015
CN    105706051      6/2016
CN    107454443     12/2017

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

Primary Examiner — Matthew Ell
Assistant Examiner — Alvaro R Calderon, IV
(74) Attorney, Agent, or Firm — Fish & Richardson P.C.

(57) ABSTRACT

Applet-based guided operation computer-implemented method, medium, and system are disclosed. In one computer-implemented method, a trigger instruction for a target applet is detected. In response to detecting the trigger instruction, a host program and a function page of the target applet are opened, a guiding page loaded on the function page is opened, and a guiding video on the guiding page is played. The guiding video includes a directional action, voice prompt, or text prompt performed by a virtual character on the guiding page, and the guiding page includes a guiding touch point. A user operation on the guiding touch point on the guiding page is detected, where the operation is based on the directional action, voice prompt, and/or text prompt. A service function corresponding to the guiding touch point in the target applet is executed based on the user operation.

20 Claims, 16 Drawing Sheets

(51) Int. Cl.
*G06F 3/04842* (2022.01)
*G06F 3/16* (2006.01)

(56) References Cited

U.S. PATENT DOCUMENTS

| | | | | |
|---|---|---|---|---|
| 9,009,585 | B1* | 4/2015 | Chetrit | G06F 9/24 715/221 |
| 2002/0031756 | A1* | 3/2002 | Holtz | G09B 7/07 434/362 |
| 2002/0187462 | A1* | 12/2002 | Mariappan | G09B 7/00 434/350 |
| 2005/0188311 | A1* | 8/2005 | Diesel | G09B 7/00 715/730 |
| 2009/0298039 | A1* | 12/2009 | Glazier | G09B 7/08 434/362 |
| 2010/0205529 | A1* | 8/2010 | Butin | G06F 9/453 715/704 |
| 2010/0205530 | A1* | 8/2010 | Butin | G06F 9/453 715/715 |
| 2014/0298162 | A1* | 10/2014 | Cohen | G06F 40/103 715/234 |
| 2015/0004577 | A1* | 1/2015 | Wu | G09B 19/00 434/236 |
| 2015/0093730 | A1* | 4/2015 | Kennerly | G09B 5/02 434/236 |
| 2015/0187221 | A1* | 7/2015 | Hinman | G09B 19/00 434/236 |
| 2016/0173578 | A1* | 6/2016 | Sharma | H04L 51/02 709/203 |
| 2016/0328743 | A1* | 11/2016 | Militi | G06Q 30/0255 |
| 2016/0350977 | A1* | 12/2016 | Doronichev | G06F 3/0482 |
| 2018/0075321 | A1* | 3/2018 | Tyrrell | G06K 9/00677 |
| 2019/0332400 | A1* | 10/2019 | Spoor | G06F 9/453 |
| 2019/0340714 | A1* | 11/2019 | Bennett | G06Q 30/08 |

OTHER PUBLICATIONS

Nakamoto, "Bitcoin: A Peer-to-Peer Electronic Cash System," www.bitcoin.org, 2005, 9 pages.

* cited by examiner

PAGE GUIDING METHODS, APPARATUSES, AND ELECTRONIC DEVICES

CROSS-REFERENCE TO RELATED APPLICATION

This application claims priority to Chinese Patent Application No. 202011012201.5, filed on Sep. 23, 2020, which is hereby incorporated by reference in its entirety.

TECHNICAL FIELD

Embodiments of the present specification relate to the field of Internet technologies, and in particular, to page guiding methods, apparatuses, and electronic devices.

BACKGROUND

Urban services, such as bus and subway cards, medical insurance and social insurance, and/or provident funds, have very strong publicity and service promotion needs when new functions or services are implemented. It is expected that users can be promoted to use the new functions or services through publicity. However, editing work of promotion articles of the new functions or services is often completed by respective propaganda departments of organizations. As a result, many new functions or services are only publicized, but actually used by few users.

SUMMARY

Embodiments of the present specification provide page guiding methods, apparatuses, and electronic devices, to enable a user to directly perform an operation in a guided process by combining a guiding video with a function page, thereby enhancing operation memory, reducing efforts involved in understanding the operation, and improving interest of the user in using the new functions or services, to enable the user to be patient and interested in further operations.

According to a first aspect, the embodiments of the present specification provide a page guiding method, including: a trigger instruction for a target applet is detected; a host program of the target applet is opened in response to the trigger instruction, and then a function page of the target applet is opened, and a guiding page loaded on the function page is opened and a guiding video is played on the guiding page, where the guiding video includes a directional action, a voice prompt, and/or a text prompt performed by a virtual character on the guiding page, and the guiding page includes a guiding touch point; an operation performed by a user on the guiding touch point on the guiding page based on the directional action, the voice prompt, and/or the text prompt is obtained; and a service function corresponding to the guiding touch point in the target applet is executed based on the operation performed by the user on the guiding touch point on the guiding page.

In the previously-mentioned page guiding method, after detecting the trigger instruction for the target applet, an electronic device opens the host program of the target applet in response to the trigger instruction, and then opens the function page of the target applet, and opens the guiding page loaded on the function page and plays the guiding video on the guiding page. The guiding video includes the directional action, the voice prompt, and/or the text prompt performed by the virtual character on the guiding page, and the guiding page includes the guiding touch point. Next, the electronic device can obtain the operation performed by the user on the guiding touch point based on the directional action, the voice prompt, and/or the text prompt, and then can execute the service function corresponding to the guiding touch point in the target applet based on the operation performed by the user on the guiding touch point, to enable the user to directly perform an operation on the guiding page by combining the guiding video with the function page, thereby enhancing operation memory of the user, reducing efforts involved in understanding the operation, and improving interest of the user in using the new functions or services, to enable the user to be patient and interested in further operations.

In a possible implementation, the detecting a trigger instruction for a target applet includes: detecting that a trigger password corresponding to the target applet exists in password space when the host program is opened; or detecting an operation performed by the user on a trigger icon corresponding to the target applet.

In a possible implementation, before the detecting that a trigger password corresponding to the target applet exists in password space when the host program is opened, the method further includes: the trigger password corresponding to the target applet is copied to the password space.

In a possible implementation, after the opening a host program of the target applet in response to the trigger instruction, the method further includes: an entry page of the target applet is displayed, where the entry page includes an icon of the target applet and an image of the virtual character pointing to the icon of the target applet.

In a possible implementation, the executing a service function corresponding to the guiding touch point in the target applet based on the operation performed by the user on the guiding touch point on the guiding page includes: displaying a page of the target applet corresponding to the guiding touch point based on the operation performed by the user on the guiding touch point on the guiding page; or invoking a component in an electronic device based on the operation performed by the user on the guiding touch point on the guiding page, to execute the service function corresponding to the guiding touch point in the target applet.

In a possible implementation, the guiding page further includes a stop playing icon; and after the opening a guiding page loaded on the function page and playing a guiding video on the guiding page, the method further includes: an operation performed by the user on the stop playing icon on the guiding page is obtained; and playing of the guiding video is stopped in response to the operation performed by the user on the stop playing icon on the guiding page.

In a possible implementation, before the stopping playing the guiding video, the method further includes: a stop playing setting page is displayed in response to the operation performed by the user on the stop playing icon on the guiding page, where the setting page includes a stop playing once icon and a stop playing permanently icon; and an icon operated by the user on the stop playing setting page is obtained; and the stopping playing the guiding video includes: stopping playing the guiding video only once or stopping playing the guiding video permanently based on the icon operated by the user on the stop playing setting page.

According to a second aspect, the embodiments of the present specification provide a page guiding apparatus, including: a detection module, configured to detect a trigger instruction for a target applet; an opening module, configured to open a host program of the target applet in response to the trigger instruction detected by the detection module, and then open a function page of the target applet, and open a guiding page loaded on the function page and play a guiding video on the guiding page, where the guiding video includes a directional action, a voice prompt, and/or a text prompt performed by a virtual character on the guiding page, and the guiding page includes a guiding touch point; an acquisition module, configured to obtain an operation performed by a user on the guiding touch point on the guiding page based on the directional action, the voice prompt, and/or the text prompt; and a processing module, configured to execute a service function corresponding to the guiding touch point in the target applet based on the operation performed by the user on the guiding touch point on the guiding page.

In a possible implementation, the detection module is specifically configured to detect that a trigger password corresponding to the target applet exists in password space when the host program is opened; or detect an operation performed by the user on a trigger icon corresponding to the target applet.

In a possible implementation, the page guiding apparatus further includes: a copying module, configured to copy the trigger password corresponding to the target applet to the password space before the detection module detects that the trigger password corresponding to the target applet exists in the password space.

In a possible implementation, the page guiding apparatus further includes: a display module, configured to display an entry page of the target applet after the opening module opens the host program of the target applet in response to the trigger instruction, where the entry page includes an icon of the target applet and an image of the virtual character pointing to the icon of the target applet.

In a possible implementation, the processing module is specifically configured to display a page of the target applet corresponding to the guiding touch point based on the operation performed by the user on the guiding touch point on the guiding page; or invoke a component in an electronic device based on the operation performed by the user on the guiding touch point on the guiding page, to execute the service function corresponding to the guiding touch point in the target applet.

In a possible implementation, the guiding page further includes a stop playing icon; and the acquisition module is further configured to obtain an operation performed by the user on the stop playing icon on the guiding page after the opening module opens the guiding page loaded on the function page and plays the guiding video on the guiding page; and the processing module is further configured to stop playing the guiding video in response to the operation performed by the user on the stop playing icon on the guiding page.

In a possible implementation, the page guiding apparatus further includes: a display module, where the display module is configured to display a stop playing setting page in response to the operation performed by the user on the stop playing icon on the guiding page before the processing module stops playing the guiding video, where the setting page includes a stop playing once icon and a stop playing permanently icon; the acquisition module is further configured to obtain an icon operated by the user on the stop playing setting page; and the processing module is specifically configured to stop playing the guiding video only once or stop playing the guiding video permanently based on the icon operated by the user on the stop playing setting page.

According to a third aspect, the embodiments of the present specification provide an electronic device, including: at least one processor; and at least one memory communicably coupled to the processor.

The memory stores program instructions that can be executed by the processor, and the processor can invoke the program instructions to perform the methods provided in the first aspect.

According to a fourth aspect, the embodiments of the present specification provide a non-transitory computer-readable storage medium. The non-transitory computer-readable storage medium stores computer instructions, and the computer instructions enable the computer to perform the methods provided in the first aspect.

It should be understood that technical solutions of the second aspect to the fourth aspect of the embodiments of the present specification are consistent with the technical solutions of the first aspect of the embodiments of the present specification, and beneficial effects obtained in the aspects and corresponding feasible implementations are similar and are omitted for simplicity.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description show merely some embodiments of the present invention, and a person of ordinary skill in the art can still derive other drawings from these accompanying drawings without creative efforts.

DESCRIPTION OF EMBODIMENTS

To better understand the technical solutions of the present specification, the following describes the embodiments of the present specification in detail with reference to the accompanying drawings.

It should be clear that the described embodiments are merely some but not all of the embodiments of the present specification. All other embodiments obtained by a person of ordinary skill in the art based on the embodiments of the present specification without creative efforts shall fall within the protection scope of the present specification.

The terms used in the embodiments of the present specification are merely used to describe specific embodiments, and are not intended to limit the present specification. The singular forms "a," "the," and "this" used in the embodiments of the present specification and the appended claims are also intended to include plural forms, unless otherwise specified in the context clearly.

In the existing technology, currently, promotion content of an in-app service of an electronic service platform is usually promoted to the outside by using a function-based guiding long diagram plus guiding words "search an application (App) of the electronic service platform for . . . " However, operation content guided in the long diagram needs to be memorized by users before the users perform operations in the App of the e-commerce platform, which is very inconvenient, causing a certain amount of loss of user base.

Figure 1:
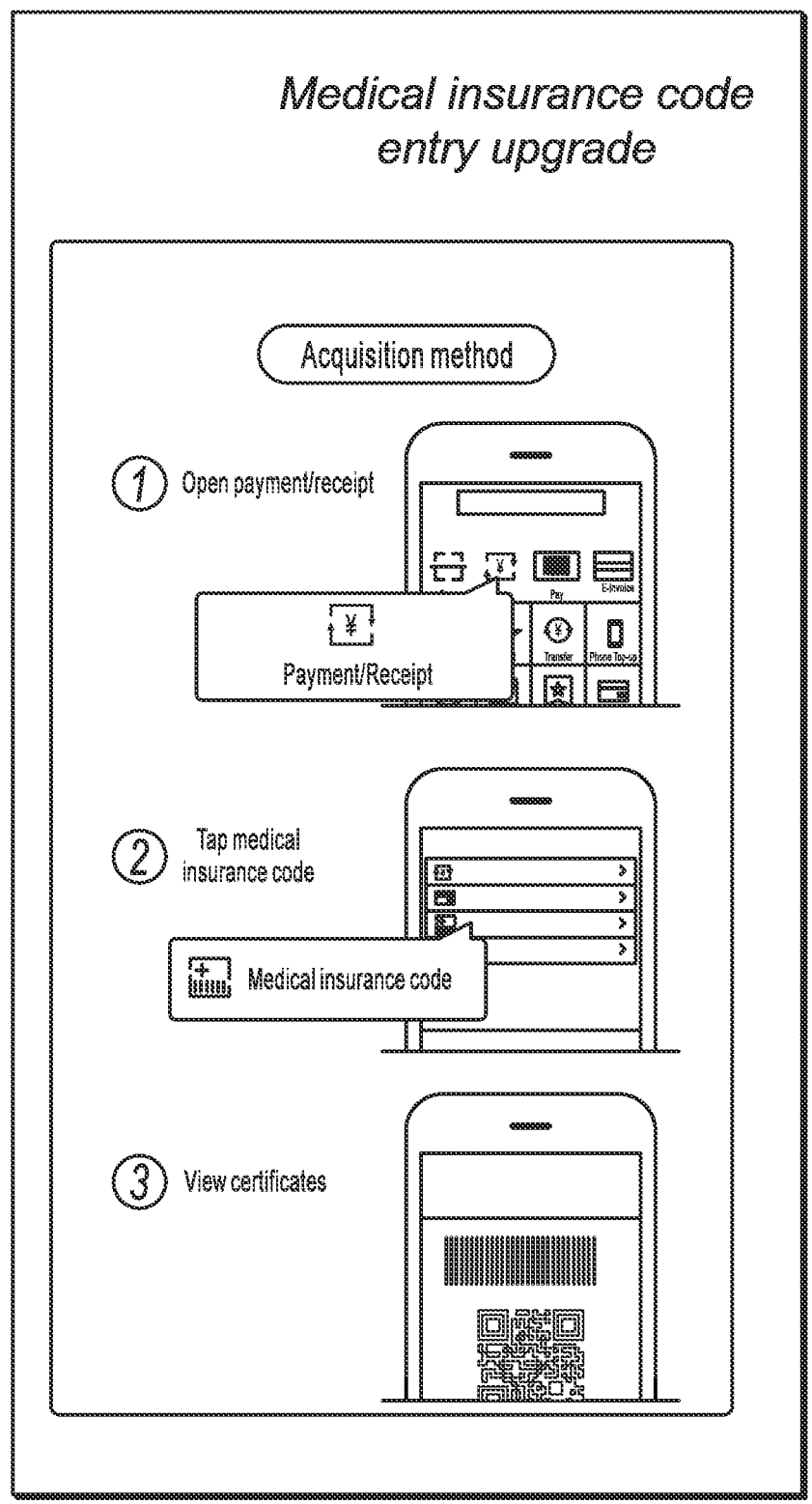
FIG. 1 is a schematic diagram illustrating a service promotion method of an electronic service platform, according to the related existing technology.

In addition, in a service promotion process of the electronic service platform, a promotion method shown in FIG. 1 is generally used. FIG. 1 is a schematic diagram illustrating a service promotion method of an electronic service platform, according to the related existing technology. In FIG. 1, an entry upgrade service of medical insurance code is used as an example for description. Although each operation step of medical insurance code upgrade is described in the promotion method shown in FIG. 1, this promotion method is difficult to understand for the elderly, children and/or users with difficulty in reading, and is difficult to attract users to perform further operations.

To resolve the previously described problem, the embodiments of the present specification provide a page guiding method. In the method, a user is enabled to directly perform an operation in a guiding process by combining a guiding video with a function page, thereby enhancing operation memory of the user, reducing efforts involved in understanding the operation, and improving interest of the user in using the new functions or services, to enable the user to be patient and interested in further operations.

Figure 2:
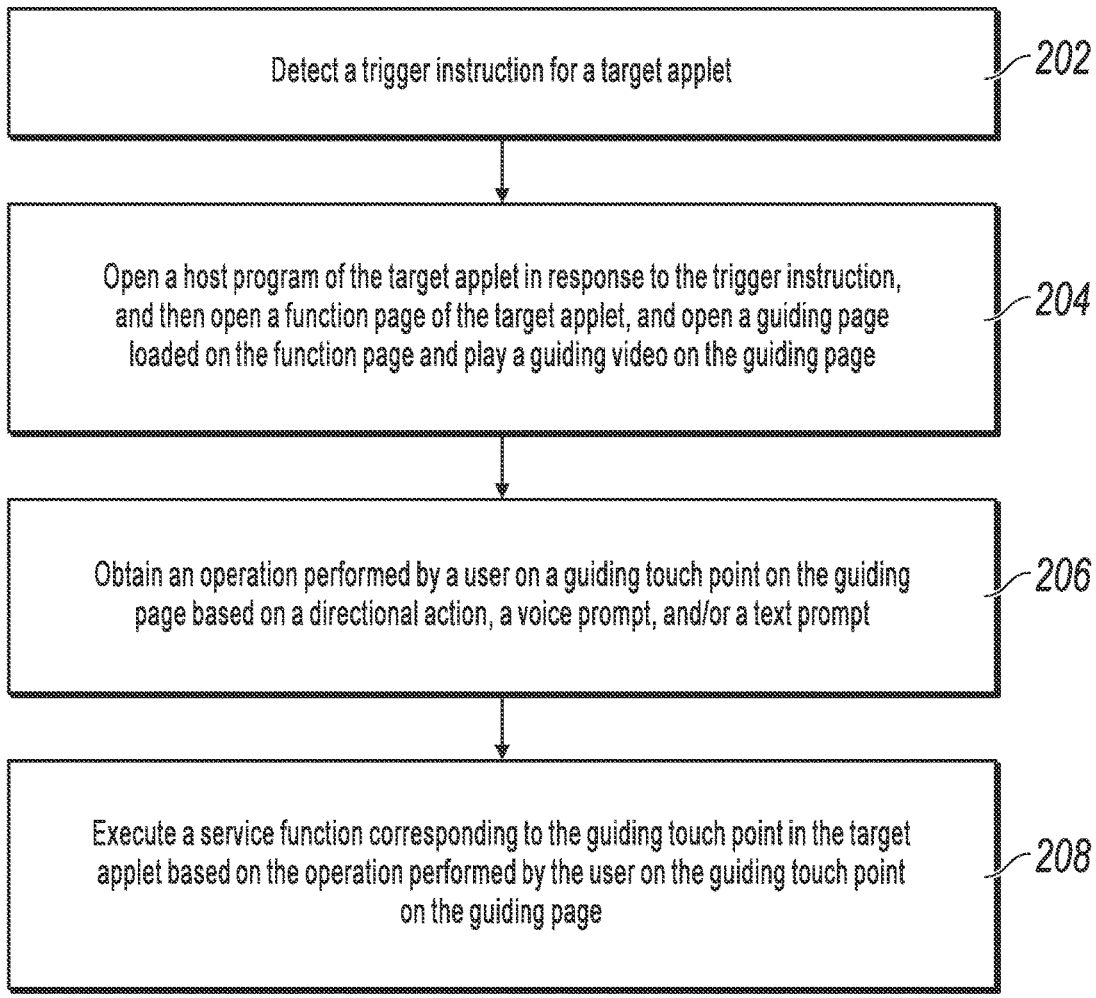
FIG. 2 is a flowchart illustrating embodiments of a page guiding method, according to the present specification.

FIG. 2 is a flowchart illustrating embodiments of a page guiding method, according to the present specification. As shown in FIG. 2, the page guiding method can include the following steps.

Step 202: Detect a trigger instruction for a target applet.

Specifically, the detecting a trigger instruction for a target applet can be: detecting that a trigger password corresponding to the target applet exists in password space when a host program of the target applet is opened; or detecting an operation performed by a user on a trigger icon corresponding to the target applet.

Before it is detected that the trigger password corresponding to the target applet exists in the password space when the host program is opened, the trigger password corresponding to the target applet can be copied to the password space.

Figure 3:
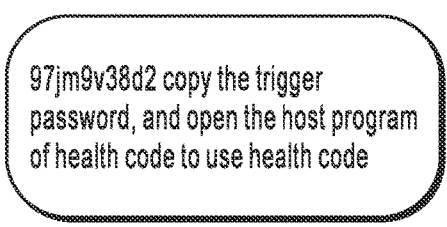
FIG. 3 is a schematic diagram illustrating a trigger password in embodiments of a page guiding method, according to the present specification.

That is, during specific implementation, in an implementation, the trigger password for the target applet can be configured in a promotion article of the target applet. For example, the trigger password can be shown in FIG. 3. FIG. 3 is a schematic diagram illustrating a trigger password in embodiments of a page guiding method, according to the present specification. FIG. 3 is used as an example. After the user copies a trigger password for health code, the trigger password for health code is copied to password space. Then, after a host program of health code is opened, an electronic device detects that the trigger password corresponding to the target applet exists in the password space, and obtains the trigger instruction for the target applet.

Figure 4:
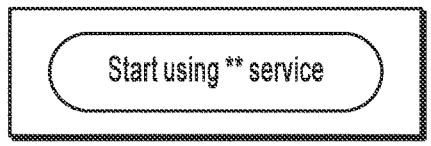
FIG. 4 is a schematic diagram illustrating a trigger icon in embodiments of a page guiding method, according to the present specification.

In another implementation, the trigger icon corresponding to the target applet can be configured on a promotion page of the target applet. For example, the trigger icon configured on the promotion page can be shown in FIG. 4. FIG. 4 is a schematic diagram illustrating a trigger icon in embodiments of a page guiding method, according to the present specification. After detecting the operation performed by the user on the trigger icon corresponding to the target applet, the electronic device obtains the trigger instruction for the target applet.

The operation performed by the user on the trigger icon corresponding to the target applet can be: The user taps, double taps, or presses and holds the trigger icon corresponding to the target applet. A specific operation form of the user is not limited in the embodiments.

In the embodiments, the electronic device can be an intelligent electronic device such as a smartphone, a smart watch, a tablet computer, or an in-car device. A specific type of the electronic device is not limited in the embodiments.

Step 204: Open the host program of the target applet in response to the trigger instruction, and then open a function page of the target applet, and open a guiding page loaded on the function page and play a guiding video on the guiding page.

The guiding video includes a directional action, a voice prompt, and/or a text prompt performed by a virtual character on the guiding page, and the guiding page includes a guiding touch point.

Figure 5:
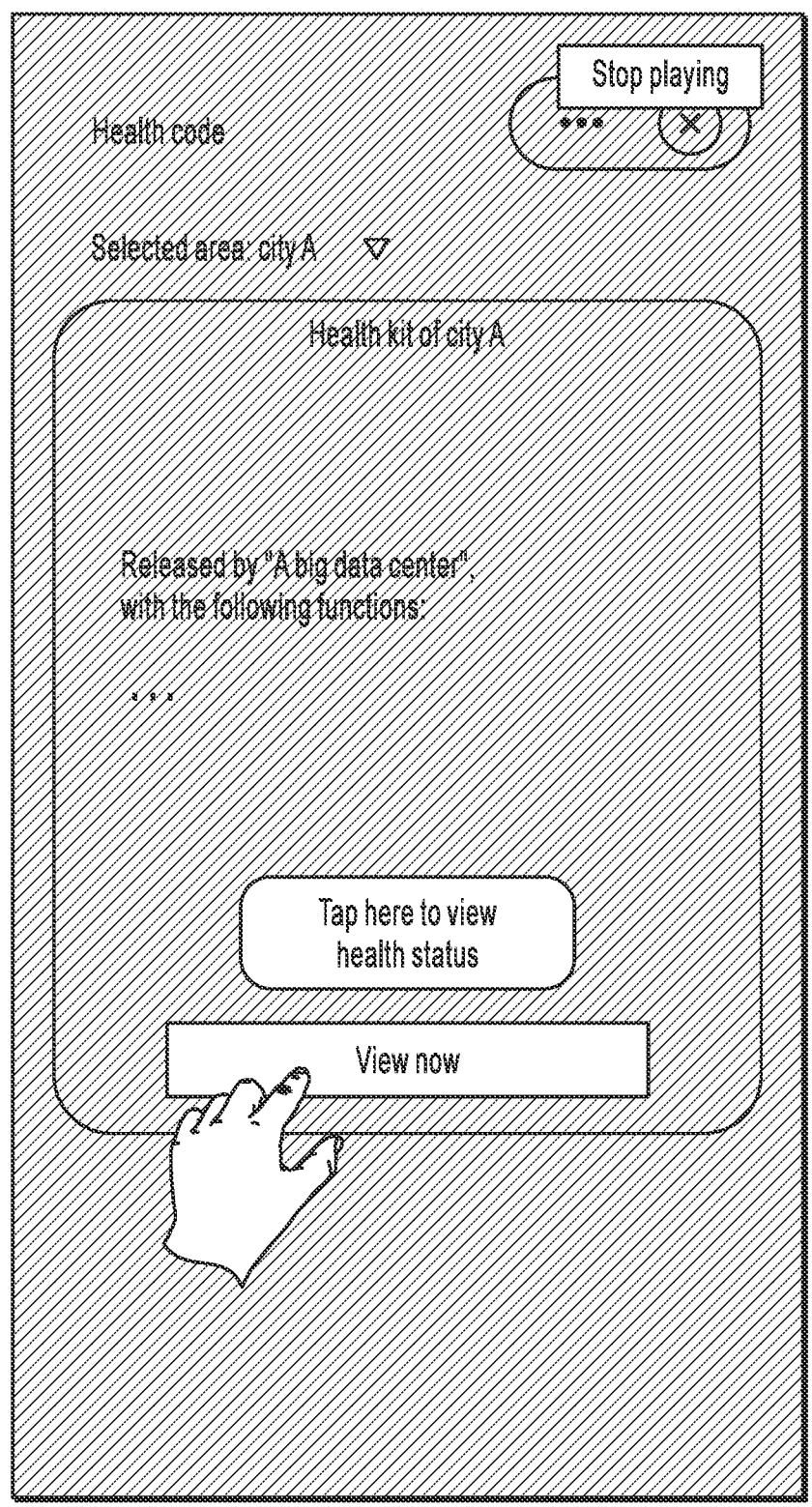
FIG. 5 is a schematic diagram illustrating a guiding page in embodiments of a page guiding method, according to the present specification.

Specifically, references can be made to FIG. 5. FIG. 5 is a schematic diagram illustrating a guiding page in embodiments of a page guiding method, according to the present specification. In FIG. 5, for example, the target applet is "health code."

As shown in FIG. 5, after a trigger instruction for health code is detected, the electronic device opens a host program of health code, and then opens a function page of health code, and opens a guiding page loaded on the function page. It can be seen from FIG. 5 that the guiding page is a floating page on the function page of health code, and a guiding video can be played on the guiding page after the guiding page is opened. The guiding video can include an action that a virtual character points to a "view now" icon on the guiding page, and can further include a text prompt "tap here to view health status," and the virtual character can further output a voice prompt "tap here to view health status." In FIG. 5, the "view now" icon is a guiding touch point in the guiding page, i.e., the guiding touch point can be an operable area that guides the user to perform a next operation on the guiding page.

Step 206: Obtain an operation performed by the user on the guiding touch point on the guiding page based on the directional action, the voice prompt, and/or the text prompt.

Specifically, the operation performed by the user on the guiding touch point on the guiding page can be as follows: The user taps, double taps, or presses and holds the guiding touch point, or the user performs a sliding operation on the guiding touch point.

FIG. 5 is used as an example. The operation performed by the user on the guiding page can be: the user taps the "view now" icon.

Step 208: Execute a service function corresponding to the guiding touch point in the target applet based on the operation performed by the user on the guiding touch point on the guiding page.

Specifically, in an implementation, the executing a service function corresponding to the guiding touch point in the target applet based on the operation performed by the user on the guiding touch point on the guiding page can be: displaying a page of the target applet corresponding to the guiding touch point based on the operation performed by the user on the guiding touch point on the guiding page.

Figure 6:
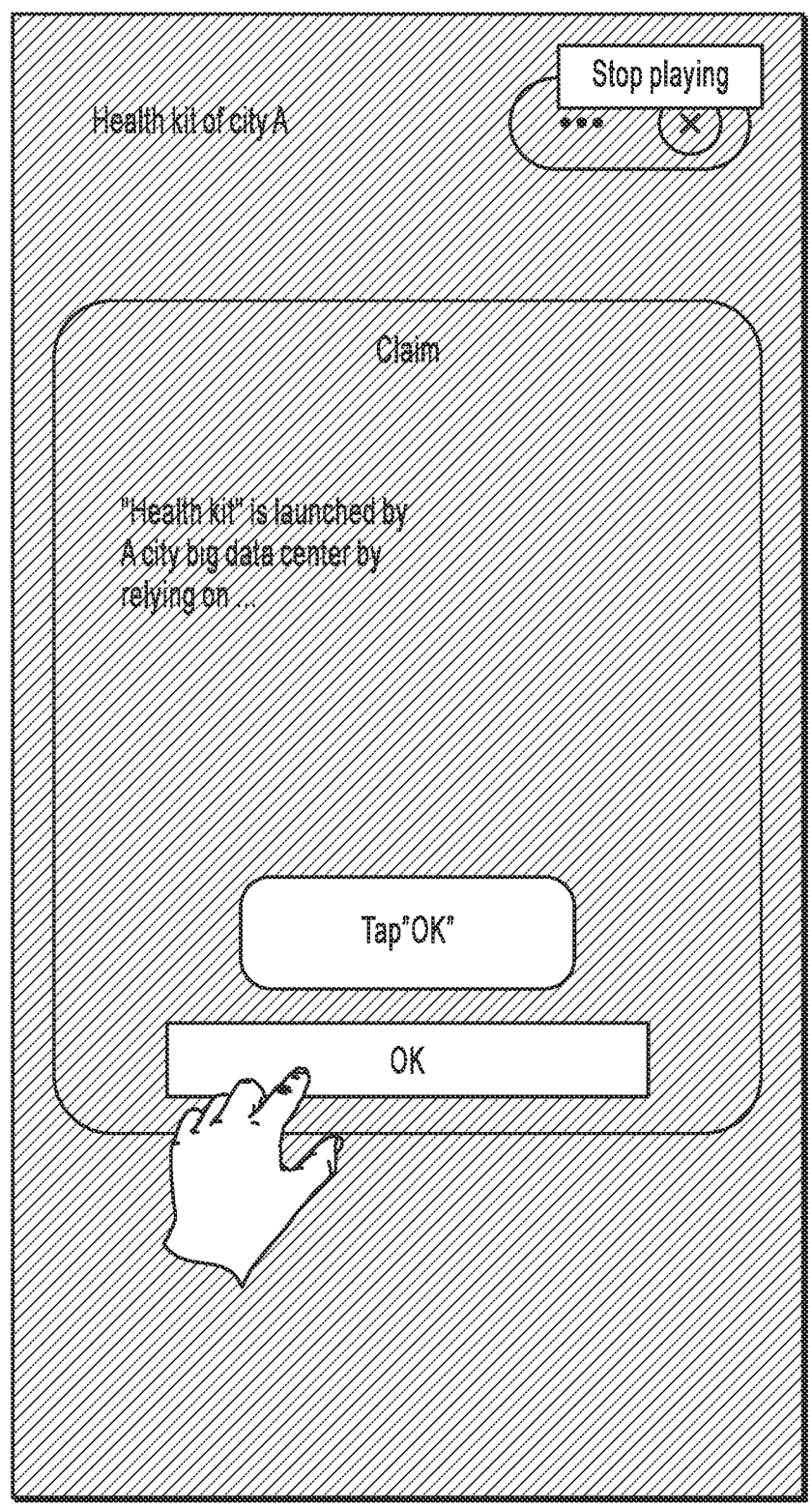
FIG. 6 is a schematic diagram illustrating a guiding page in other embodiments of a page guiding method, according to the present specification.

FIG. 5 is still used as an example. After the user taps the "view now" icon, the electronic device can display a page shown in FIG. 6. FIG. 6 is a schematic diagram illustrating a guiding page in other embodiments of a page guiding method, according to the present specification. The page shown in FIG. 6 is a function page corresponding to health code and a guiding page loaded on the function page after the "view now" icon in FIG. 5 is taped. A guiding video is also played on the guiding page. The guiding video can include an action that the virtual character points to an "OK" icon on the guiding page, and can further include a text prompt "tap 'OK,'" and the virtual character can further output a voice prompt "tap 'OK.'" In FIG. 6, the "OK" icon is a guiding touch point on the guiding page.

Figure 7:
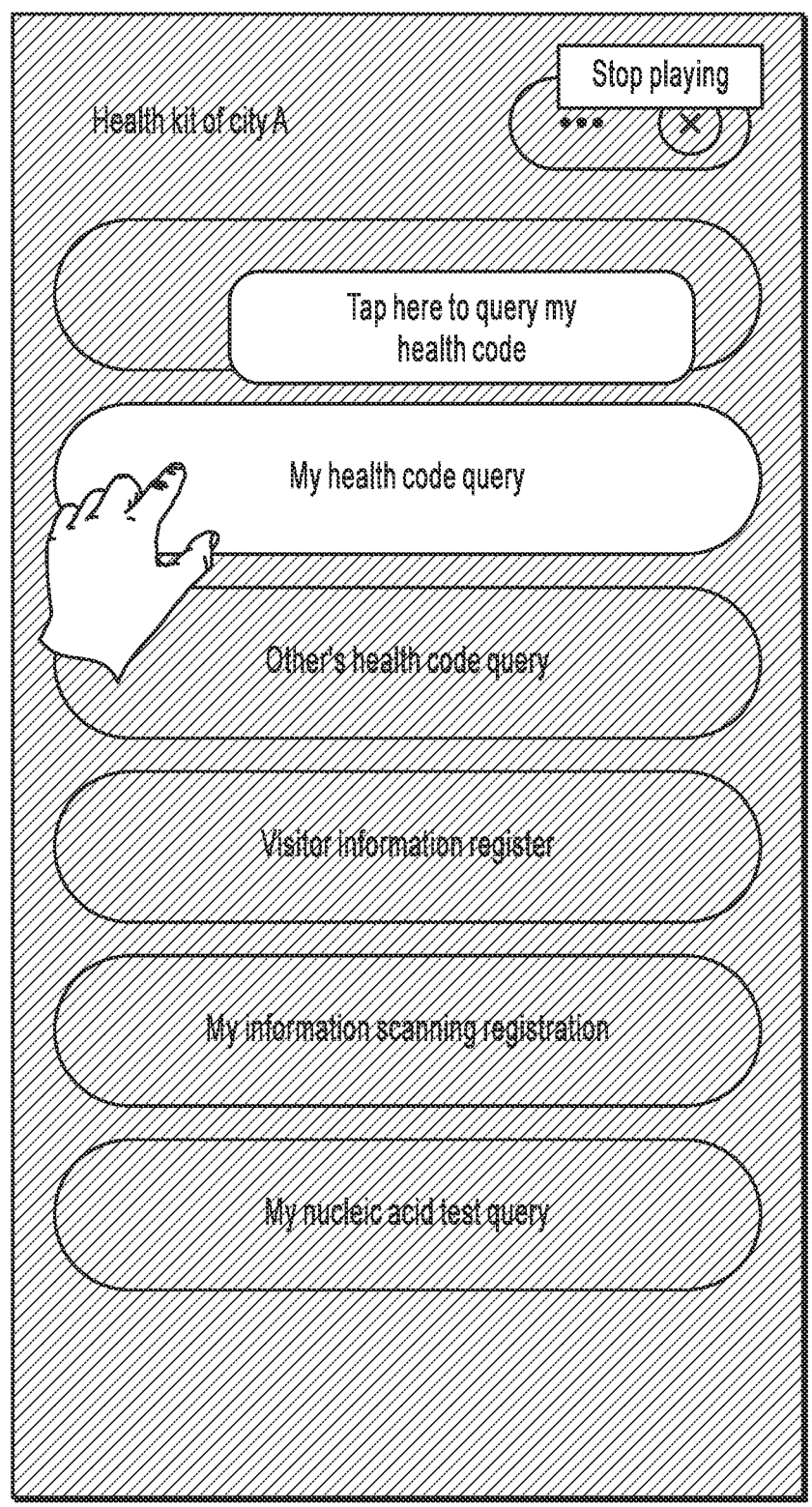
FIG. 7 is a schematic diagram illustrating a guiding page in still other embodiments of a page guiding method, according to the present specification.

Next, an operation performed by the user on the guiding touch point on the guiding page shown in FIG. 6 can be: the user taps the "OK" icon. After the user taps the "OK" icon, the electronic device can display a page shown in FIG. 7. FIG. 7 is a schematic diagram illustrating a guiding page in still other embodiments of a page guiding method, according to the present specification. The page shown in FIG. 7 is a function page corresponding to health code and a guiding page loaded on the function page after the "OK" icon in FIG. 6 is taped. A guiding video is also played on the guiding page. The guiding video can include an action that the virtual character points to a "my health code query" icon on the guiding page, and can further include a text prompt "tap here to query my health code," and the virtual character can further output a voice prompt "tap here to query my health code." In FIG. 7, the "my health code query" icon is a guiding touch point on the guiding page.

In another implementation, alternatively, the executing a service function corresponding to the guiding touch point in the target applet based on the operation performed by the user on the guiding touch point on the guiding page can be: invoking a component in the electronic device based on the operation performed by the user on the guiding touch point on the guiding page, to execute the service function corresponding to the guiding touch point in the target applet. For example, assume that a guiding touch point on a guiding page is a "scan" icon. After the user taps the "scan" icon, the electronic device invokes a camera in the electronic device to execute a scan service function.

In the embodiments, the user is enabled to directly perform corresponding operations in a guiding process by combining the virtual character with the function page, thereby enhancing operation memory, and reducing efforts involved in understanding the operation. For some non-in-demand functions or children-oriented services, interests of users can be more easily improved through animated interaction, to enable the users to be patient and interested in further operations.

In the page guiding method, after detecting the trigger instruction for the target applet, the electronic device opens the host program of the target applet in response to the trigger instruction, and then opens the function page of the target applet, and opens the guiding page loaded on the function page and plays the guiding video on the guiding page. The guiding video includes the directional action, the voice prompt, and/or the text prompt performed by the virtual character on the guiding page, and the guiding page includes the guiding touch point. Next, the electronic device can obtain the operation performed by the user on the guiding touch point based on the directional action, the voice prompt, and/or the text prompt, and then can execute the service function corresponding to the guiding touch point in the target applet based on the operation performed by the user on the guiding touch point, to enable the user to directly perform an operation on the guiding page by combining the guiding video with the function page, thereby enhancing operation memory of the user, reducing efforts involved in understanding the operation, and improving interest of the user in using the new functions or services, to enable the user to be patient and interested in further operations.

Figure 8:
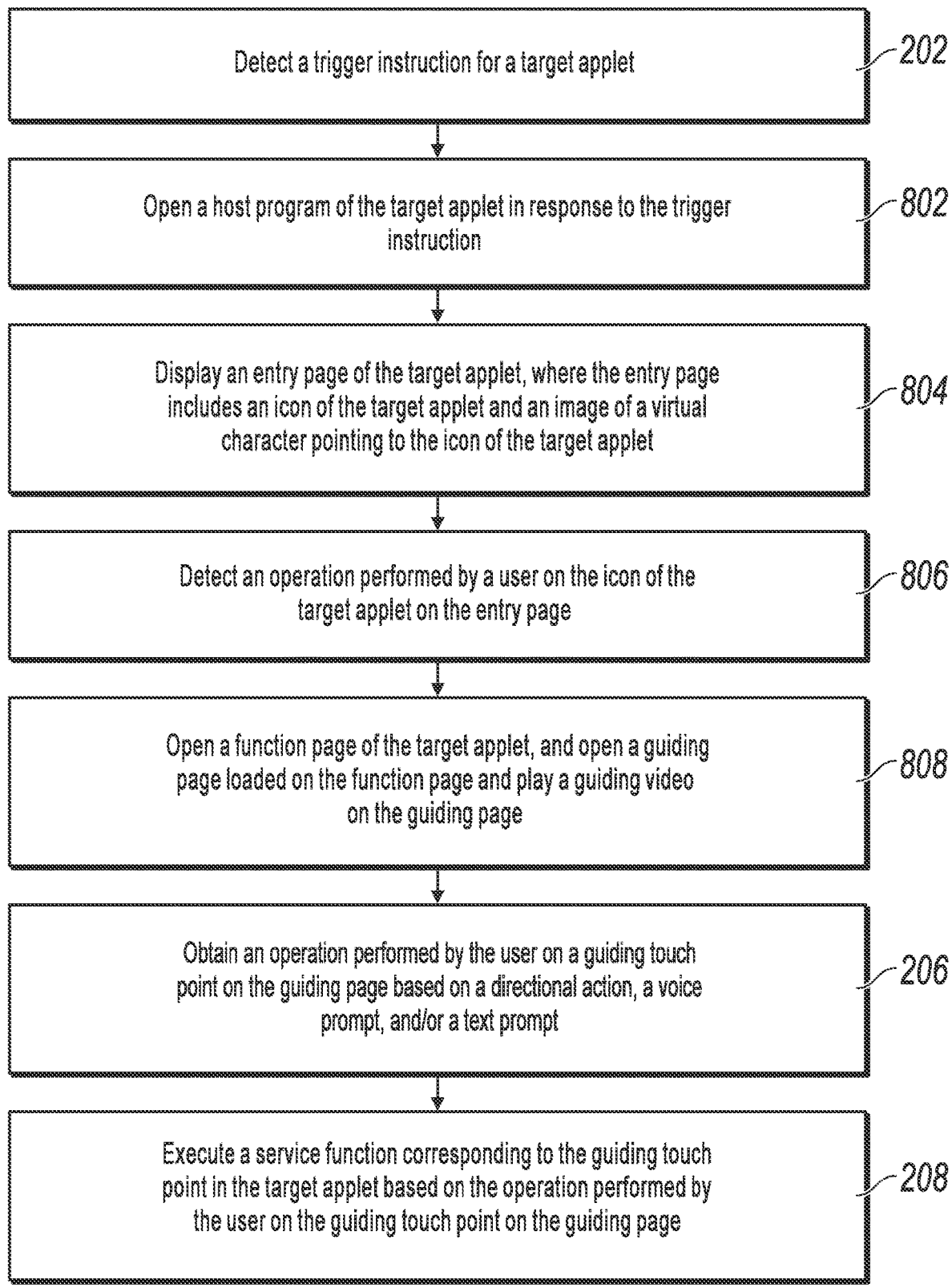
FIG. 8 is a flowchart illustrating other embodiments of a page guiding method, according to the present specification.

FIG. 8 is a flowchart illustrating other embodiments of a page guiding method, according to the present specification. As shown in FIG. 8, in the embodiments shown in FIG. 2 in the present specification, step 204 can include the following steps:

Step 802: Open the host program of the target applet in response to the trigger instruction.

Step 804: Display an entry page of the target applet, where the entry page includes an icon of the target applet and an image of the virtual character pointing to the icon of the target applet.

Figure 9:
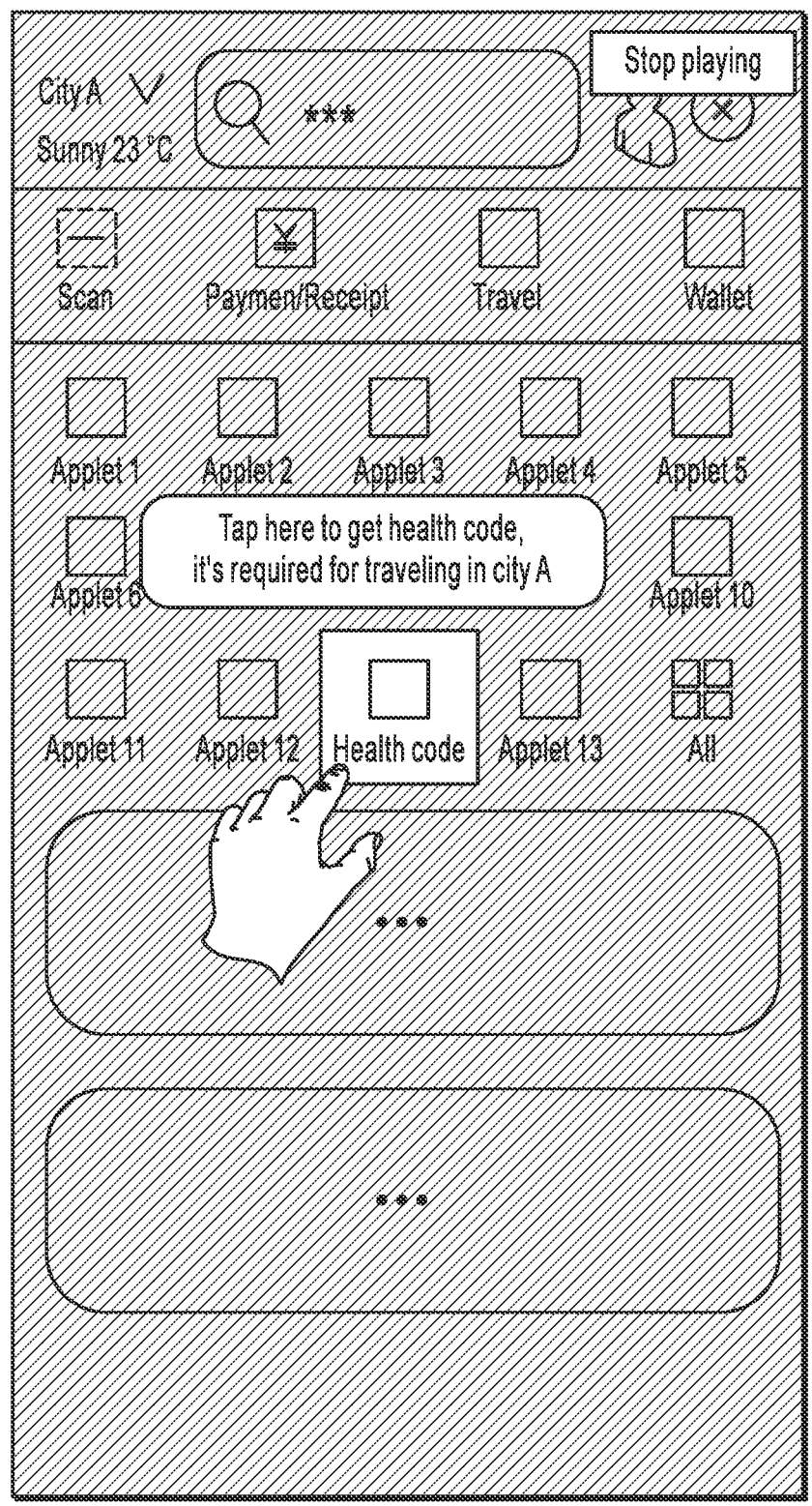
FIG. 9 is a schematic diagram illustrating an entry page in embodiments of a page guiding method, according to the present specification.

For example, the entry page of the target applet can be shown in FIG. 9. FIG. 9 is a schematic diagram illustrating an entry page in embodiments of a page guiding method, according to the present specification. In FIG. 9, for example, the target applet is health code, and an entry page of health code is displayed. It can be seen from FIG. 9 that the entry page of health code can include an icon of health code and an image of a virtual character pointing to the icon of health code. In addition, the entry page can further include a text prompt "tap here to get health code, it's required for travelling in city A." The virtual character can further output a voice of the sentence "tap here to get health code, it's required for travelling in city A," to guide the user to more intuitively find the entry of health code.

Step 806: Detect an operation performed by the user on the icon of the target applet on the entry page.

Specifically, the operation performed by the user on the icon of the target applet can include: the user taps, double taps, or presses and holds the icon of the target applet. The operation performed by the user is not limited in the embodiments.

Step 808: Open the function page of the target applet, and open the guiding page loaded on the function page and play the guiding video on the guiding page.

As described above, the function page of the target applet and the guiding page can be schematically shown in FIG. 5. Details are omitted here for simplicity.

Figure 10:
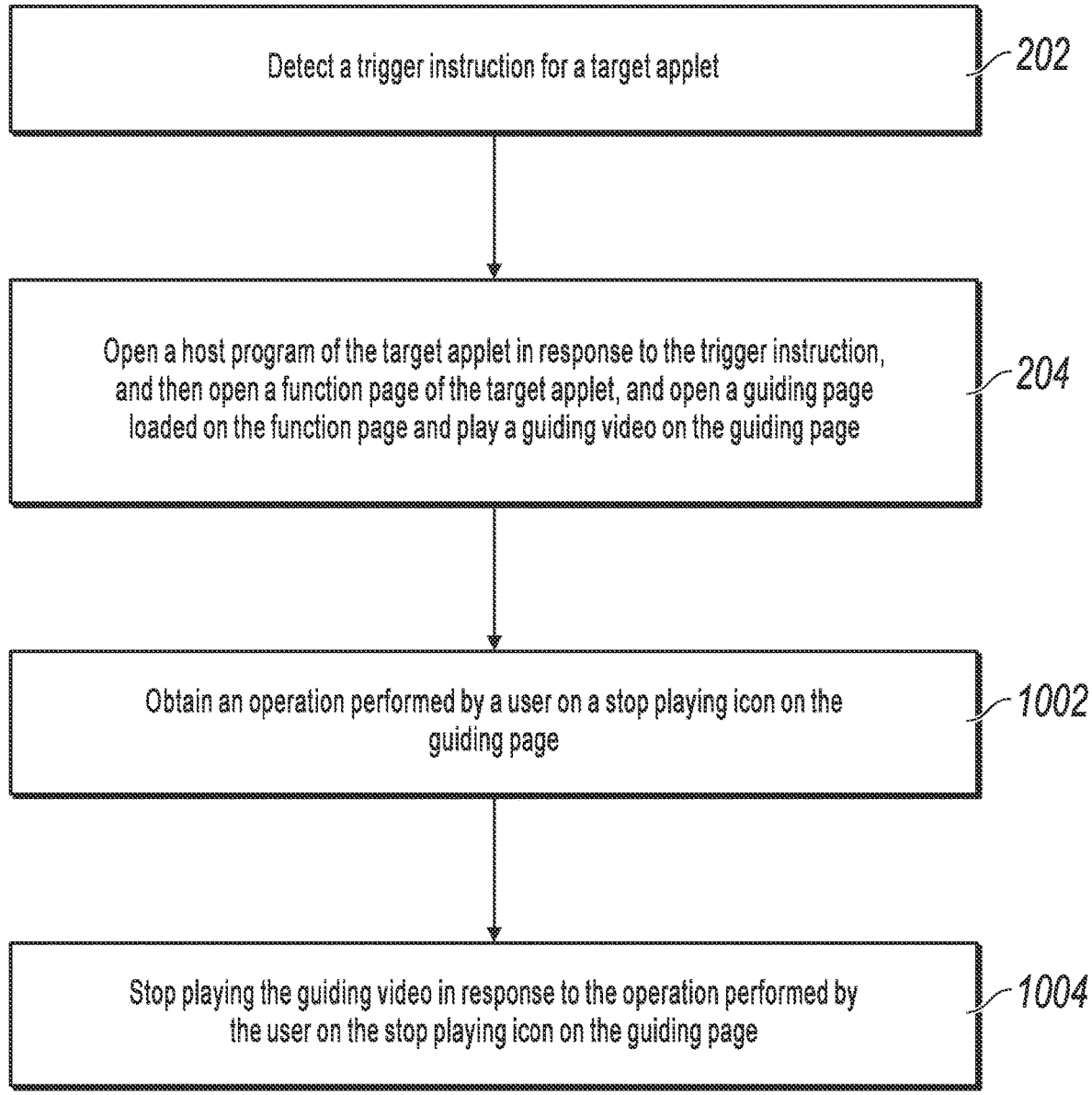
FIG. 10 is a flowchart illustrating still other embodiments of a page guiding method, according to the present specification.

FIG. 10 is a flowchart illustrating still other embodiments of a page guiding method, according to the present specification. As shown in FIG. 10, in the embodiments shown in FIG. 2 in the present specification, the guiding page further includes a stop playing icon; and after step 204, the method can further include the following steps.

Step 1002: Obtain an operation performed by the user on the stop playing icon on the guiding page.

Specifically, the operation performed by the user on the stop playing icon on the guiding page can be as follows: The user taps, double taps, or presses and holds the stop playing icon on the guiding page. The operation performed by the user is not limited in the embodiments.

Step 1004: Stop playing the guiding video in response to the operation performed by the user on the stop playing icon on the guiding page.

Specifically, it can be seen from the pages shown in FIG. 5, FIG. 6, FIG. 7, and FIG. 9 that the guiding pages each include the "stop playing" icon, and the electronic device can stop playing the guiding video after the user taps the "stop playing" icon.

Figure 11:
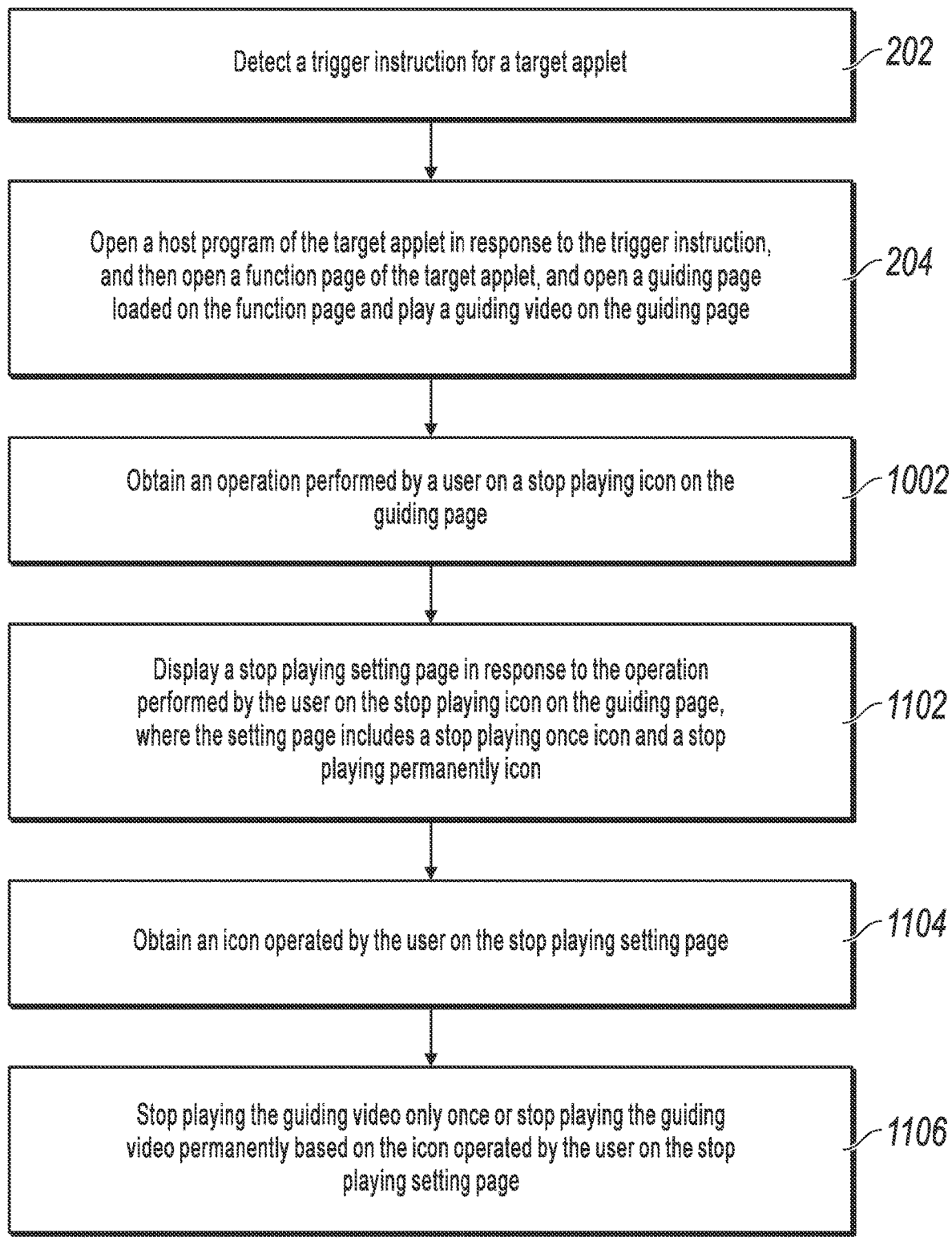
FIG. 11 is a flowchart illustrating yet other embodiments of a page guiding method, according to the present specification.

FIG. 11 is a flowchart illustrating yet other embodiments of a page guiding method, according to the present specification. As shown in FIG. 11, in the embodiments shown in FIG. 10 in the present specification, step 1004 can include the following steps:

Step 1102: Display a stop playing setting page in response to the operation performed by the user on the stop playing icon on the guiding page, where the setting page includes a stop playing once icon and a stop playing permanently icon.

Step 1104: Obtain an icon operated by the user on the stop playing setting page.

Step 1106: Stop playing the guiding video only once or stop playing the guiding video permanently based on the icon operated by the user on the stop playing setting page.

Figure 12:
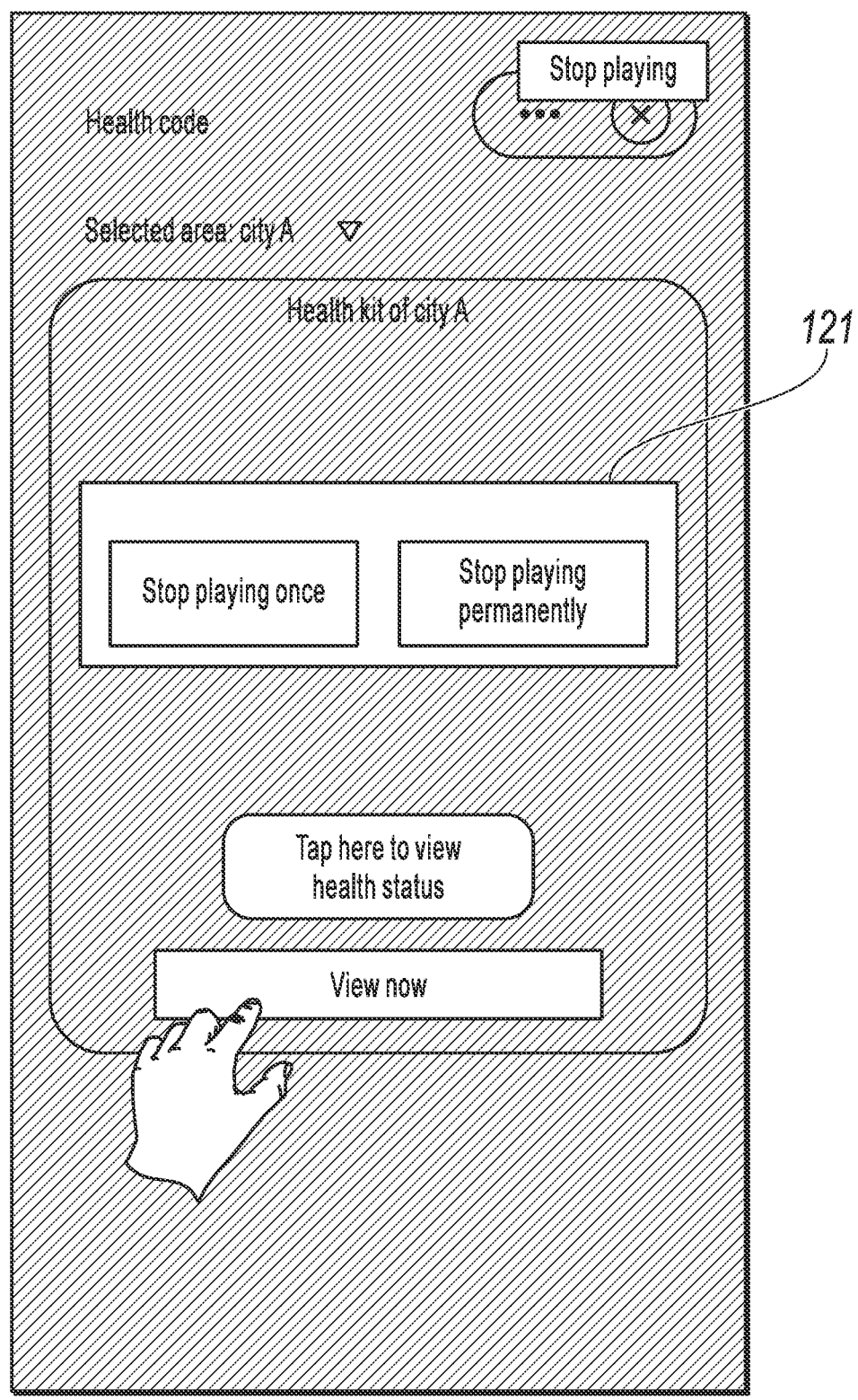
FIG. 12 is a schematic diagram illustrating a stop playing setting page in embodiments of a page guiding method, according to the present specification.

The page shown in FIG. 5 is used as an example. After the user taps a stop playing icon on the guiding page shown in FIG. 5, a stop playing setting page shown in FIG. 12 can be displayed. FIG. 12 is a schematic diagram illustrating a stop playing setting page in embodiments of a page guiding method, according to the present specification. In FIG. 12, a page 121 is the stop playing setting page. The setting page includes a stop playing once icon and a stop playing permanently icon. If the user taps the "stop playing once" icon on the stop playing setting page, playing of the guiding video is stopped once. If the user taps the "stop playing permanently" icon in the stop playing setting page, playing of the guiding video is stopped permanently.

It is worthwhile to note that, if the user does not tap the "stop playing" icon in a playing process of the guiding video, after playing of the guiding video is finished, the user can select to play the guiding video repeatedly or get to know more content.

Figure 13:
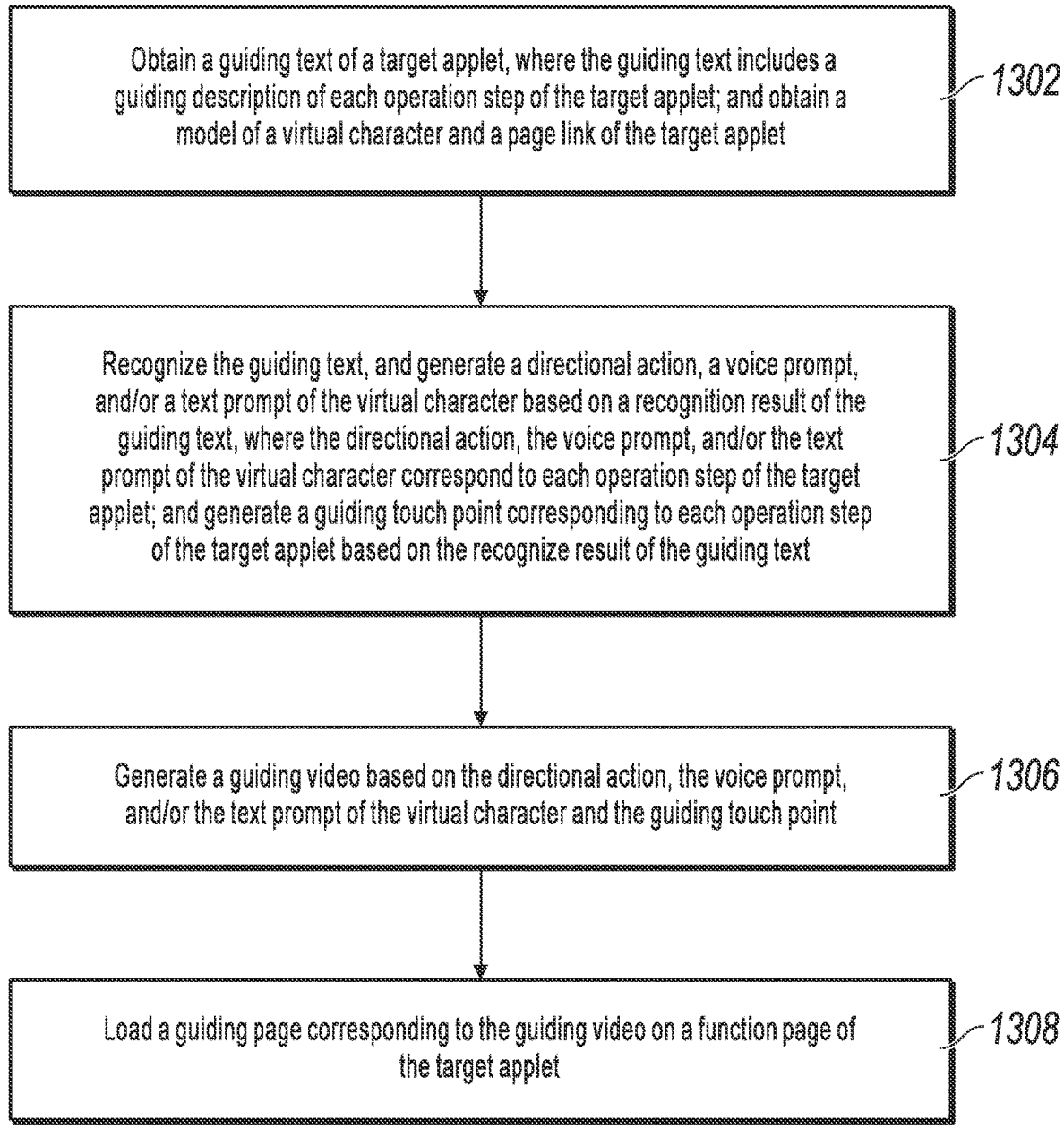
FIG. 13 is a flowchart illustrating further embodiments of a page guiding method, according to the present specification.

FIG. 13 is a flowchart illustrating further embodiments of a page guiding method, according to the present specification. As shown in FIG. 13, the page guiding method can include the following steps:

Step 1302: Obtain a guiding text of a target applet, where the guiding text includes a guiding description of each operation step of the target applet; and obtain a model of a virtual character and a page link of the target applet.

Step 1304: Recognize the guiding text, and generate a directional action, a voice prompt, and/or a text prompt of the virtual character based on a recognition result of the guiding text, where the directional action, the voice prompt, and/or the text prompt of the virtual character correspond to each operation step of the target applet; and generate a guiding touch point corresponding to each operation step of the target applet based on the recognize result of the guiding text.

Step 1306: Generate a guiding video based on the directional action, the voice prompt, and/or the text prompt of the virtual character and the guiding touch point.

Step 1308: Load a guiding page corresponding to the guiding video on a function page of the target applet.

Figure 14:
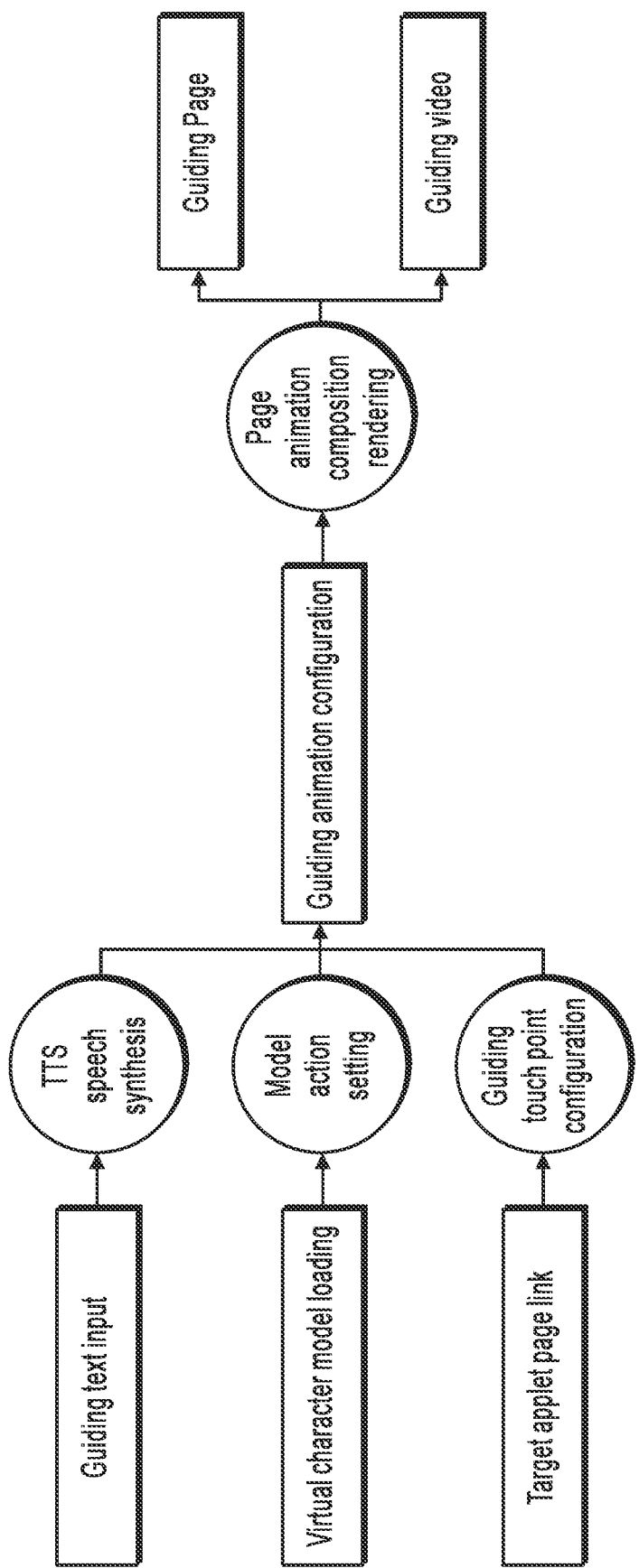
FIG. 14 is a schematic diagram illustrating guiding video generation in embodiments of a page guiding method, according to the present specification.

Specifically, references can be made to FIG. 14. FIG. 14 is a schematic diagram illustrating guiding video generation in embodiments of a page guiding method, according to the present specification. During specific implementation, an operator can enter a guiding text needed by each step of a target applet, and load a model of a virtual character. Then, the guiding text is recognized, and a directional action, a voice prompt, and/or a text prompt of the virtual character are generated based on a recognition result of the guiding text. In addition, the operator further needs to upload a page link of the target applet, and generate a guiding touch point corresponding to each operation step of the target applet based on the recognition result of the guiding text.

Then, the following configurations need to be completed in a guiding video configuration phase:
1. The virtual character can briefly introduce a service function of the target applet.
2. The virtual character performs a directional action, a voice prompt, and/or a text prompt on a guiding page to describe an operation procedure of the target applet.
3. The virtual character performs a directional action on a page to guide a user to perform an entry operation and jump.

That is, a guiding video can be generated based on the directional action, the voice prompt, and/or the text prompt of the virtual character and the guiding touch point.

Next, after the guiding video is configured, the guiding page corresponding to the guiding video can be loaded on a function page of the target applet.

Subsequently, after the function page of the target applet is opened, the guiding page is opened and the guiding video is played on the guiding page, to guide the user to perform an operation on the guiding page.

In the embodiments, the operator can quickly generate the guiding page with the virtual character based on an operation need of the operator, and can obtain the guiding video by configuring the guiding text. That is, in the embodiments, the operator only needs to load the model of the virtual character without creating each action image of the virtual character, and then enter the guiding text needed by each step of the target program. After obtaining the model of the virtual character and the guiding text, an electronic service platform can recognize the guiding text, and generate the directional action, the voice prompt, and/or the text prompt of the virtual character based on the recognition result of the guiding text. Simply, the operator can configure a guiding video only by loading a model of a virtual model and entering a guiding text.

In the page guiding method provided in the embodiments of the present specification, a guiding page and a guiding video of an immersive virtual character are used to guide a user to perform an operation, and an entire guiding process of the immersive virtual character is performed on a real operation page, thereby reducing efforts involved in understanding the operation of the user for a corresponding function. In addition, no research and develop team or design team needs to participate in the page guiding method. When an operator promotes a new service by using the method, the operator can independently configure an immersive guiding video without participant of any designer or research and develop personnel.

In addition, compared with the past propagation method using a screenshot and an operation picture, in the embodiments of the present specification, completed video content is more standard and clearer, and a unified video format for promoting a service of an electronic service platform to other platforms is also conveniently formed, thereby strengthening connection of the electronic service platform and various business partners in publicity, and further strengthening a brand image.

Specific embodiments of the present specification are described above. Other embodiments fall within the scope of the appended claims. In some cases, the actions or steps described in the claims can be performed in an order different from the order in the embodiments and the desired results can still be achieved. In addition, the process depicted in the accompanying drawings does not necessarily need the shown particular execution order or sequence to achieve the desired results. In some implementations, multitasking processing and parallel processing are allowed or may be advantageous.

Figure 15:
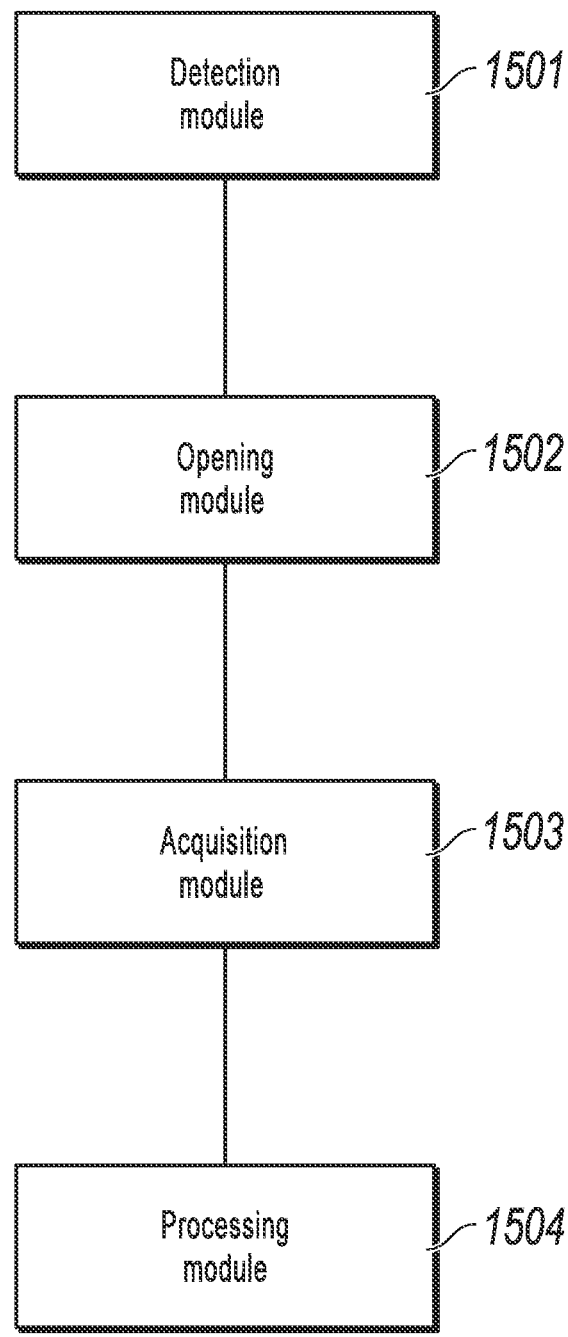
FIG. 15 is a schematic structural diagram illustrating embodiments of a page guiding apparatus, according to the present specification.

FIG. 15 is a schematic structural diagram illustrating embodiments of a page guiding apparatus, according to the present specification. As shown in FIG. 15, the page guiding apparatus can include a detection module 1501, an opening module 1502, an acquisition module 1503, and a processing module 1504.

The detection module 1501 is configured to detect a trigger instruction for a target applet.

The opening module 1502 is configured to open a host program of the target applet in response to the trigger instruction detected by the detection module 1501, and then open a function page of the target applet, and open a guiding page loaded on the function page and play a guiding video on the guiding page, where the guiding video includes a directional action, a voice prompt, and/or a text prompt performed by a virtual character on the guiding page, and the guiding page includes a guiding touch point.

The acquisition module 1503 is configured to obtain an operation performed by a user on the guiding touch point on the guiding page based on the directional action, the voice prompt, and/or the text prompt.

The processing module 1504 is configured to execute a service function corresponding to the guiding touch point in the target applet based on the operation performed by the user on the guiding touch point on the guiding page.

The page guiding apparatus provided in the embodiments shown in FIG. 15 can be configured to execute the technical solutions of the method embodiments shown in FIG. 2 in the present specification. For implementation principles and technical effects of the page guiding apparatus, references can be further made to related descriptions in the method embodiments.

Figure 16:
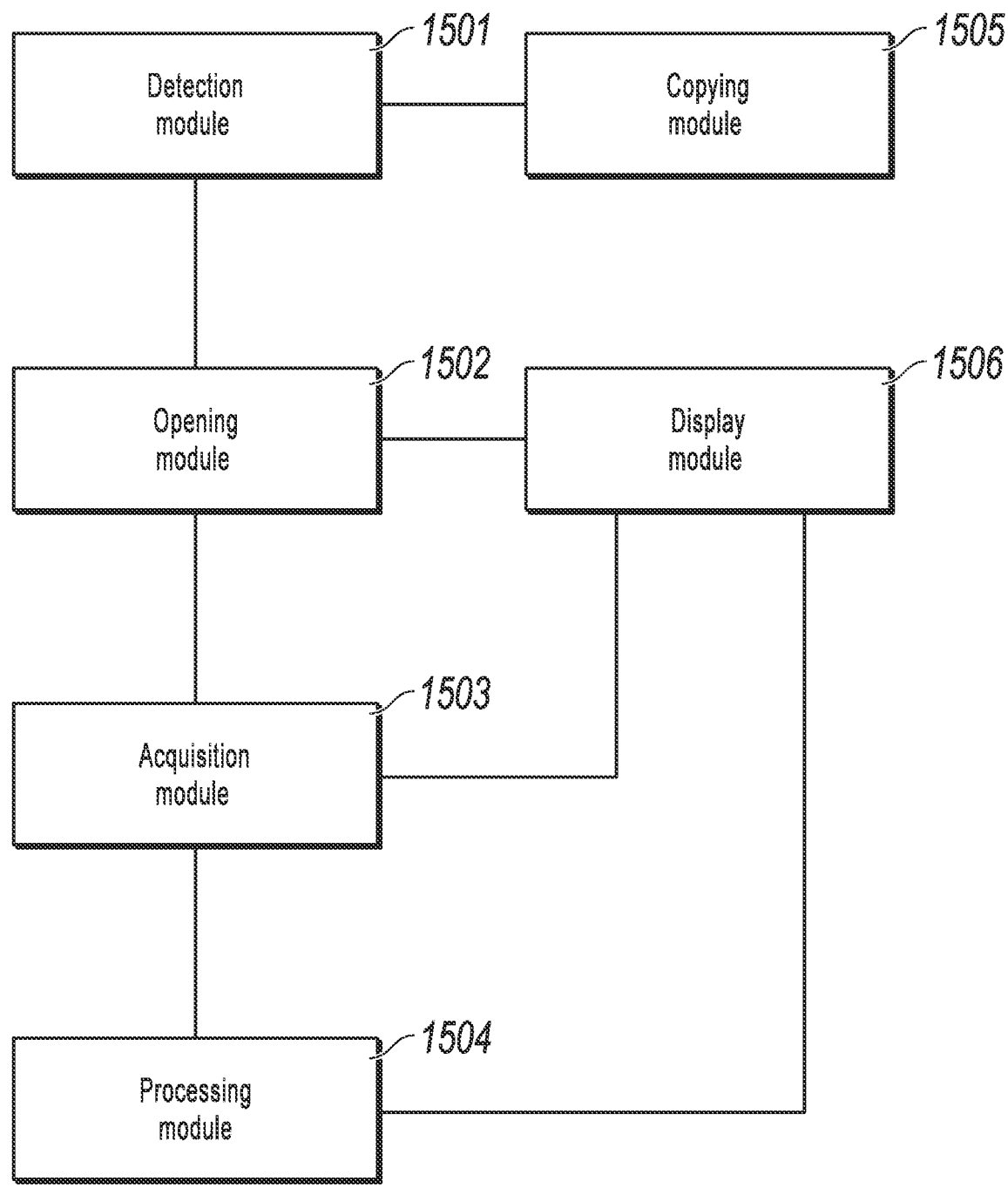
FIG. 16 is a schematic structural diagram illustrating other embodiments of a page guiding apparatus, according to the present specification.

FIG. 16 is a schematic structural diagram illustrating other embodiments of a page guiding apparatus, according to the present specification. Compared with the page guiding apparatus shown in FIG. 15, in the page guiding apparatus shown in FIG. 16, the detection module 1501 is specifically configured to detect that a trigger password corresponding to the target applet exists in password space when the host program is opened; or detect an operation performed by the user on a trigger icon corresponding to the target applet.

In the embodiments, the page guiding apparatus can further include a copying module 1505.

The copying module 1505 is configured to copy the trigger password corresponding to the target applet to the password space before the detection module 1501 detects that the trigger password corresponding to the target applet exists in the password space.

Further, the page guiding apparatus can further include a display module 1506.

The display module 1506 is configured to display an entry page of the target applet after the opening module 1502 opens the host program of the target applet in response to the trigger instruction, where the entry page includes an icon of the target applet and an image of the virtual character pointing to the icon of the target applet.

In an implementation of the embodiments, the processing module 1504 is specifically configured to display a page of the target applet corresponding to the guiding touch point based on the operation performed by the user on the guiding touch point on the guiding page; or invoke a component in an electronic device based on the operation performed by the user on the guiding touch point on the guiding page, to execute the service function corresponding to the guiding touch point in the target applet.

In another implementation of the embodiments, the guiding page further includes a stop playing icon; and the acquisition module 1503 is further configured to obtain an operation performed by the user on the stop playing icon on the guiding page after the opening module 1502 opens the guiding page loaded on the function page and plays the guiding video on the guiding page; and the processing module 1504 is further configured to stop playing the guiding video in response to the operation performed by the user on the stop playing icon on the guiding page.

In the embodiments, the page guiding apparatus can further include a display module 1506.

The display module 1506 is configured to display a stop playing setting page in response to the operation performed by the user on the stop playing icon on the guiding page before the processing module 1504 stops playing the guiding video, where the setting page includes a stop playing once icon and a stop playing permanently icon.

The acquisition module 1503 is further configured to obtain an icon operated by the user on the stop playing setting page.

The processing module 1504 is specifically configured to stop playing the guiding video only once or stop playing the guiding video permanently based on the icon operated by the user on the stop playing setting page.

The page guiding apparatus provided in the embodiments shown in FIG. 16 can be configured to execute the technical solutions of the method embodiments shown in FIG. 2 to FIG. 14 in the present application. For implementation principles and technical effects of the page guiding apparatus, references can be further made to related descriptions in the method embodiments.

Figure 17:
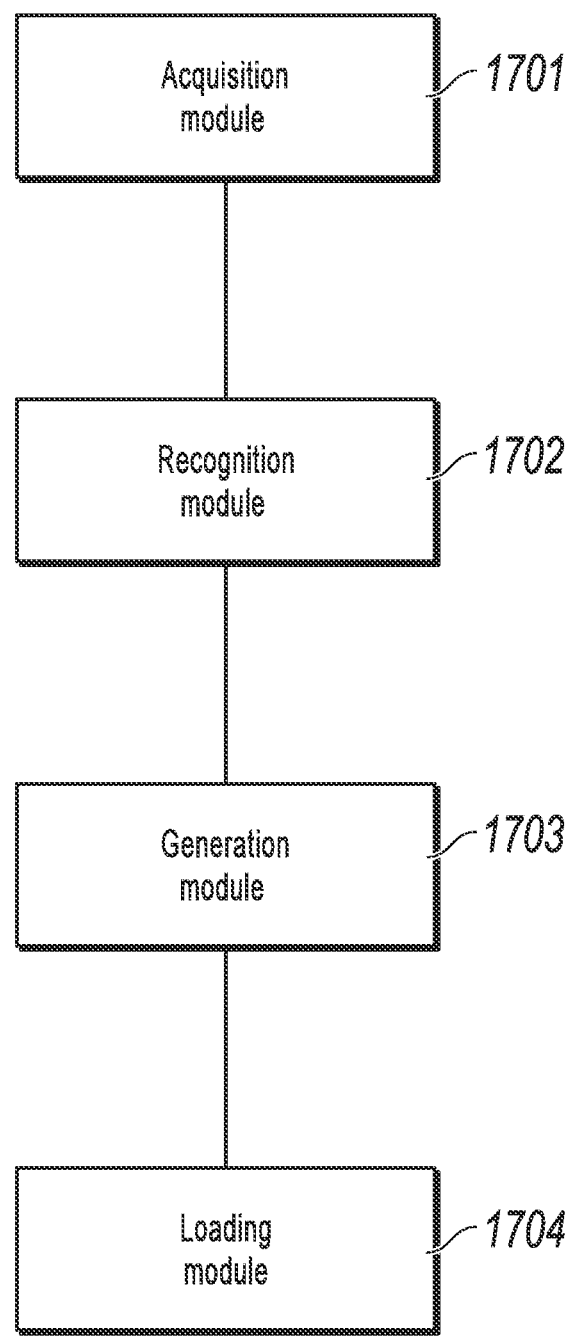
FIG. 17 is a schematic structural diagram illustrating still other embodiments of a page guiding apparatus, according to the present specification.

FIG. 17 is a schematic structural diagram illustrating still other embodiments of a page guiding apparatus, according to the present specification. As shown in FIG. 17, the page guiding apparatus can include an acquisition module 1701, a recognition module 1702, a generation module 1703, and a loading module 1704.

The acquisition module 1701 is configured to obtain a guiding text of a target applet, where the guiding text includes a guiding description of each operation step of the target applet; and obtain a model of a virtual character and a page link of the target applet.

The recognition module 1702 is configured to recognize the guiding text.

The generation module 1703 is configured to generate a directional action, a voice prompt, and/or a text prompt of the virtual character based on a recognition result of the guiding text, where the directional action, the voice prompt, and/or the text prompt of the virtual character correspond/ corresponds to each operation step of the target applet; generate a guiding touch point corresponding to each operation step of the target applet based on the recognize result of the guiding text; and generate a guiding video based on the directional action, the voice prompt, and/or the text prompt of the virtual character and the guiding touch point.

The loading module 1704 is configured to load a guiding page corresponding to the guiding video on a function page of the target applet.

The page guiding apparatus provided in the embodiments shown in FIG. 17 can serve as an electronic service platform or a part of the electronic service platform to execute the technical solutions of the method embodiments shown in FIG. 13 in the present application. For implementation principles and technical effects of the page guiding apparatus, references can be further made to related descriptions in the method embodiments.

Figure 18:
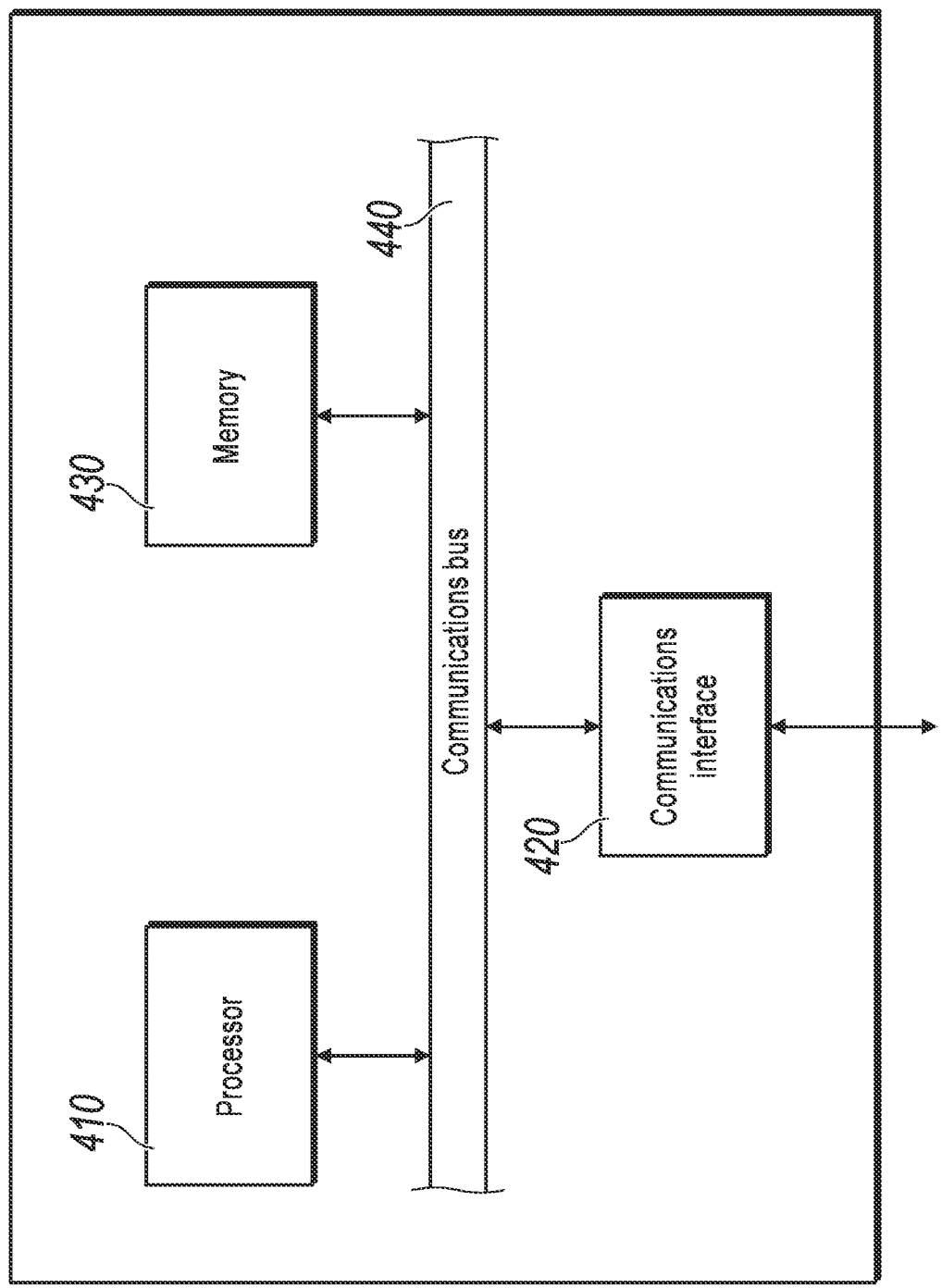
FIG. 18 is a schematic structural diagram illustrating embodiments of an electronic device, according to the present specification.

FIG. 18 is a schematic structural diagram illustrating embodiments of an electronic device, according to the present specification. As shown in FIG. 18, the electronic device can include at least one processor; and at least one memory communicably coupled to the processor. The memory stores program instructions that can be executed by the processor, and the processor can invoke the program instructions to perform the page guiding method provided in the embodiments shown in FIG. 2 to FIG. 15 in the present specification.

The electronic device can be an intelligent electronic device such as a smartphone, a smart watch, a tablet computer, or an in-car device. Alternatively, the electronic device can be a server, for example, a server of an electronic service platform. A form of the electronic device is not limited in the embodiments.

FIG. 18 is a block diagram of an example electronic device adapted to implement implementations of the present specification.

The electronic device shown in FIG. 18 is merely an example, and shall not constitute any limitation on the functions and use scope of the embodiment of the present specification.

As shown in FIG. 18, the electronic device is represented as a general computing device. Components of the electronic device can include but are not limited to one or more processors 410, a communications interface 420, a memory 430, and a communications bus 440 that connects different components (including the memory 430, the communications interface 420, and the processing unit 410).

The communications bus 440 represents one or more of several types of bus structures, including a memory bus or a memory controller, a peripheral bus, a graphics acceleration port, or a local bus that uses any one of multiple bus structures. For example, the communications bus 440 can include but is not limited to an industry standard architecture (ISA) bus, a micro channel architecture (MAC) bus, an enhanced ISA bus, a video electronics standards association (VESA) local bus, and a peripheral component interconnection (PCI) bus.

The electronic device typically includes multiple computer system readable media. These media can be any available media that can be accessed by the electronic device, including volatile and non-volatile media, removable and non-removable media.

The memory 430 can include a computer system readable medium in a form of a volatile memory, such as a random access memory (RAM) and/or a cache memory. The memory 430 can include at least one program product. The program product has a group of program modules (for example, at least one program module) configured to perform the functions of the embodiments shown in FIG. 2 to FIG. 15 in the present specification.

A program/utility tool having a group of program modules (at least one program module) can be stored in the memory 430. The program module includes but is not limited to an operating system, one or more applications, other program modules, and program data. Each or a combination of these examples may include an implementation of a network environment. The program module usually performs the functions and/or methods in the embodiments described in FIG. 2 to FIG. 15 in the present specification.

The processor 410 runs the program stored in the memory 430, to perform various functional applications and data processing, for example, implement the page guiding method provided in the embodiments shown in FIG. 2 to FIG. 15 in the present specification.

The embodiments of the present specification provide a non-transitory computer-readable storage medium. The non-transitory computer-readable storage medium stores computer instructions, and the computer instructions enable the computer to perform the page guiding method provided in the embodiments shown in FIG. 2 to FIG. 15 in the present specification.

The non-transitory computer-readable storage medium can be one computer-readable medium or any combination of multiple computer-readable media. The computer-readable medium can be a computer-readable signal medium or a computer-readable storage medium. For example, the computer-readable storage medium can be but is limited to an electrical, magnetic, optical, electromagnetic, infrared, or semiconductor system, apparatus, or device, or any combination thereof. A more specific example (non-exhaustive list) of the computer-readable storage medium includes an electrical connection with one or more leads, a portable computer disk, a hard disk, a random access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof. In the present document, the computer-readable storage medium can be any tangible medium that includes or stores a program, and the program can be used by or in combination with an instruction execution system, apparatus, or device.

The computer-readable signal medium can include a data signal propagated in a baseband or as a part of a carrier, and the data signal includes computer-readable program code. The propagated data signal can be in various forms, including but not limited to an electromagnetic signal, an optical signal, or any suitable combination thereof. Alternatively, the computer-readable signal medium can be any computer-readable medium other than the computer-readable storage medium, and the computer-readable medium can send, propagate, or transmit a program used by or in combination with an instruction execution system, apparatus, or device.

Program code included in the computer-readable medium can be transmitted by using any suitable medium, including but not limited to a wireless medium, a wire, an optical cable, a radio frequency (RF) medium, or any suitable combination thereof.

Computer program code used to perform the operations of the present specification can be written in one or more programming languages or a combination thereof. The programming languages include an object-oriented programming language such as Java, Smalltalk, or C++, and also include a conventional procedural programming language such as "C" language or a similar programming language. The program code can be completely executed in a user computer, partially executed in a user computer, executed as an independent software package, partially executed in a user computer and partially executed in a remote computer, or completely executed in a remote computer or server. In a case involving a remote computer, the remote computer can be connected to a user computer via any type of network, including a local area network (LAN) or a wide area network (WAN), or can be connected to an external computer (via, for example, the Internet by using an Internet service provider).

Specific embodiments of the present specification are described above. Other embodiments fall within the scope of the appended claims. In some cases, the actions or steps described in the claims can be performed in an order different from the order in the embodiments and the desired results can still be achieved. In addition, the process depicted in the accompanying drawings does not necessarily need the shown particular execution order or sequence to achieve the desired results. In some implementations, multitasking processing and parallel processing are allowed or may be advantageous.

In the description of the present specification, descriptions of reference terms such as "an embodiment," "some embodiments," "example", "specific example," and "some examples" mean that specific features, structures, materials, or characteristics described with reference to the embodiments or examples are included in at least one embodiment or example in the present specification. In the present specification, the example expressions of the terms are not necessarily specific to the same embodiment or example. In addition, the described specific features, structures, materials, or characteristics can be combined in a proper way in any one or more embodiments or examples. In addition, a person skilled in the art can integrate or combine different embodiments or examples and features of different embodiments or examples described in the present specification, provided that they do not conflict with each other.

In addition, the terms "first" and "second" are merely intended for a purpose of description, and shall not be understood as an indication or implication of relative importance or an implicit indication of the number of indicated technical features. Therefore, a feature limited by "first" or "second" can explicitly or implicitly include at least one such feature. In the description of the present specification, "multiple" means at least two, for example, two or three, unless otherwise specifically limited.

Descriptions of any process or method described in the flowcharts or in other ways here can be understood to indicate that one or more modules, segments, or parts of code of executable instructions used to implement a specific logical function or process step are included, the scope of preferred implementations of the present specification includes other implementations, and functions can be performed in an order other than the shown or discussed order, including a basically simultaneous way or a reverse order based on the functions. This should be understood by a person skilled in the art including the embodiments of the present specification.

Depending on the context, for example, the word "if" used here can be explained as "while," "when," "in response to detecting," or "in response to determining." Similarly, depending on the context, phrases "if determining" or "if detecting (a stated condition or event)" can be explained as "when determining," "in response to determining," or "when detecting (the stated condition or event)," or "in response to detecting (the stated condition or event)."

It is worthwhile to note that the terminal in the embodiments of the present specification can include but is not limited to a personal computer (PC), a personal digital assistant (PDA), a wireless handheld device, a tablet computer (tablet computer), a mobile phone, an MP3 player, an MP4 player, etc.

In the embodiments provided in the present specification, it is worthwhile to understand that the disclosed system, apparatus, and method can be implemented in other ways. For example, the described apparatus embodiments are merely examples. For example, the unit division is merely logical function division and can be other division during actual implementation. For example, multiple units or components can be combined or integrated into another system, or some features may be ignored or may not be performed. In addition, the displayed or discussed mutual couplings or direct couplings or communication connections can be implemented by using some interfaces. The indirect couplings or communication connections between the apparatuses or units can be implemented in electronic, mechanical, or other forms.

In addition, functional units in the embodiments of the present specification can be integrated into one processing unit, or each of the units can exist alone physically, or two or more units can be integrated into one unit. The integrated unit can be implemented in a form of hardware, or can be implemented in a form of hardware in combination with a software functional unit.

The integrated unit implemented in a form of a software functional unit can be stored in a computer-readable storage medium. The software functional unit is stored in a storage medium and includes several instructions for instructing a computer apparatus (which can be a personal computer, a server, a network apparatus, etc.) or a processor (processor) to perform some of the steps of the methods described in the embodiments of the present specification. The previously described storage medium includes any medium that can store program code, such as a USB flash drive, a removable hard disk, a read-only memory (ROM), a random access memory (RAM), a magnetic disk, or an optical disc.

The previous descriptions are merely preferred embodiments of the present specification, but are not intended to limit the present specification. Any modification, equivalent replacement, improvement, etc. made without departing from the spirit and principle of the present specification shall fall within the protection scope of the present specification.

What is claimed is:

1. A computer-implemented method for applet-based guided operations, comprising:
   detecting a trigger instruction for a target applet;
   in response to detecting the trigger instruction,
      opening a function page of the target applet;
      opening a guiding page loaded on the function page; and
      playing a guiding video on the guiding page; and
      wherein the guiding video comprises a virtual character that performs a directional action, a voice prompt, and a text prompt on the guiding page, wherein the directional action, the voice prompt, and the text prompt all correspond to a guiding touch point, wherein the guiding page comprises the guiding touch point, and wherein the guiding touch point corresponds to a service function step of the target applet;
   detecting an operation performed by a user on the guiding touch point on the guiding page, wherein the operation is based on at least one of the directional action, the voice prompt, or the text prompt; and
   executing the service function step corresponding to the guiding touch point based on the operation performed by the user on the guiding touch point on the guiding page.

2. The computer-implemented method of claim 1, wherein detecting the trigger instruction for the target applet comprises:
   opening a host program of the target applet and in response to opening the host program, detecting that a trigger password corresponding to the target applet exists in a password space; or
   detecting a triggering operation performed by the user on a trigger icon corresponding to the target applet and opening the host program of the target applet.

3. The computer-implemented method of claim 1, further comprising:
   storing a trigger password corresponding to the target applet in a password space,
   wherein detecting the trigger instruction for the target applet comprises opening a host program of the target applet and in response to opening the host program, detecting that the trigger password corresponding to the target applet exists in the password space.

4. The computer-implemented method of claim 1, further comprising:
   opening a host program of the target applet and in response to opening the host program, detecting that a trigger password corresponding to the target applet exists in a password space; and
   after opening the host program of the target applet, displaying an entry page of the target applet, wherein the entry page comprises an icon of the target applet and an image of the virtual character pointing to the icon of the target applet.

5. The computer-implemented method of claim 1, wherein executing the service function corresponding to the guiding touch point in the target applet based on the operation performed by the user on the guiding touch point on the guiding page comprises:
   displaying a first page of the target applet corresponding to the guiding touch point based on the operation performed by the user on the guiding touch point on the guiding page; or
   invoking a component in an electronic device based on the operation performed by the user on the guiding touch point on the guiding page, and executing the service function corresponding to the guiding touch point in the target applet.

6. The computer-implemented method of claim 1, wherein the guiding page further comprises a stop playing icon, and wherein the computer-implemented method further comprises, after opening the guiding page loaded on the function page and playing the guiding video on the guiding page:
   detecting a video stopping operation performed by the user on the stop playing icon on the guiding page; and
   stopping the guiding video from playing in response to the video stopping operation performed by the user on the stop playing icon on the guiding page.

7. The computer-implemented method of claim 6, further comprising, before stopping the guiding video from playing:
   displaying a stop playing setting page in response to the video stopping operation performed by the user on the stop playing icon on the guiding page, wherein the stop playing setting page comprises a stop playing once icon and a stop playing permanently icon; and
   identifying a video stopping icon operated by the user on the stop playing setting page, wherein the video stopping icon is the stop playing once icon or the stop playing permanently icon, and
   wherein stopping the guiding video from playing comprises stopping the guiding video from playing only once or stopping the guiding video from playing permanently, based on the video stopping icon operated by the user on the stop playing setting page.

8. A non-transitory, computer-readable medium storing one or more instructions executable by a computer system to perform operations comprising:
   detecting a trigger instruction for a target applet;
   in response to detecting the trigger instruction,
      opening a function page of the target applet;
      opening a guiding page loaded on the function page; and
      playing a guiding video on the guiding page; and
      wherein the guiding video comprises a virtual character that performs a directional action, a voice prompt, and a text prompt on the guiding page, wherein the directional action, the voice prompt, and the text prompt all correspond to a guiding touch point, wherein the guiding page comprises the guiding touch point, and wherein the guiding touch point corresponds to a service function step of the target applet;
   detecting an operation performed by a user on the guiding touch point on the guiding page, wherein the operation is based on at least one of the directional action, the voice prompt, or the text prompt; and
   executing the service function step corresponding to the guiding touch point based on the operation performed by the user on the guiding touch point on the guiding page.

9. The non-transitory, computer-readable medium of claim 8, wherein detecting the trigger instruction for the target applet comprises:
   opening a host program of the target applet and in response to opening the host program, detecting that a trigger password corresponding to the target applet exists in a password space; or detecting a triggering operation performed by the user on a trigger icon corresponding to the target applet and opening the host program of the target applet.

10. The non-transitory, computer-readable medium of claim 8, wherein the operations further comprise:
storing a trigger password corresponding to the target applet in a password space,
wherein detecting the trigger instruction for the target applet comprises opening a host program of the target applet and in response to opening the host program, detecting that the trigger password corresponding to the target applet exists in the password space.

11. The non-transitory, computer-readable medium of claim 8, wherein the operations further comprise:
opening a host program of the target applet and in response to opening the host program, detecting that a trigger password corresponding to the target applet exists in a password space; and
after opening the host program of the target applet, displaying an entry page of the target applet, wherein the entry page comprises an icon of the target applet and an image of the virtual character pointing to the icon of the target applet.

12. The non-transitory, computer-readable medium of claim 8, wherein executing the service function corresponding to the guiding touch point in the target applet based on the operation performed by the user on the guiding touch point on the guiding page comprises:
displaying a first page of the target applet corresponding to the guiding touch point based on the operation performed by the user on the guiding touch point on the guiding page; or
invoking a component in an electronic device based on the operation performed by the user on the guiding touch point on the guiding page, and executing the service function corresponding to the guiding touch point in the target applet.

13. The non-transitory, computer-readable medium of claim 8, wherein the guiding page further comprises a stop playing icon, and wherein the operations further comprise, after opening the guiding page loaded on the function page and playing the guiding video on the guiding page:
detecting a video stopping operation performed by the user on the stop playing icon on the guiding page; and
stopping the guiding video from playing in response to the video stopping operation performed by the user on the stop playing icon on the guiding page.

14. The non-transitory, computer-readable medium of claim 13, wherein the operations further comprise, before stopping the guiding video from playing:
displaying a stop playing setting page in response to the video stopping operation performed by the user on the stop playing icon on the guiding page, wherein the stop playing setting page comprises a stop playing once icon and a stop playing permanently icon; and
identifying a video stopping icon operated by the user on the stop playing setting page, wherein the video stopping icon is the stop playing once icon or the stop playing permanently icon, and
wherein stopping the guiding video from playing comprises stopping the guiding video from playing only once or stopping the guiding video from playing permanently, based on the video stopping icon operated by the user on the stop playing setting page.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
detecting a trigger instruction for a target applet;
in response to detecting the trigger instruction,
opening a function page of the target applet;
opening a guiding page loaded on the function page; and
playing a guiding video on the guiding page; and
wherein the guiding video comprises a virtual character that performs a directional action, a voice prompt, and a text prompt on the guiding page, wherein the directional action, the voice prompt, and the text prompt all correspond to a guiding touch point, wherein the guiding page comprises the guiding touch point, and wherein the guiding touch point corresponds to a service function step of the target applet;
detecting an operation performed by a user on the guiding touch point on the guiding page, wherein the operation is based on at least one of the directional action, the voice prompt, or the text prompt; and
executing the service function step corresponding to the guiding touch point based on the operation performed by the user on the guiding touch point on the guiding page.

16. The computer-implemented system of claim 15, wherein detecting the trigger instruction for the target applet comprises:
opening a host program of the target applet and in response to opening the host program, detecting that a trigger password corresponding to the target applet exists in a password space; or
detecting a triggering operation performed by the user on a trigger icon corresponding to the target applet and opening the host program of the target applet.

17. The computer-implemented system of claim 15, wherein the one or more operations further comprise:
storing a trigger password corresponding to the target applet in a password space,
wherein detecting the trigger instruction for the target applet comprises opening a host program of the target applet and in response to opening the host program, detecting that the trigger password corresponding to the target applet exists in the password space.

18. The computer-implemented system of claim 15, wherein the one or more operations further comprise:
opening a host program of the target applet and in response to opening the host program, detecting that a trigger password corresponding to the target applet exists in a password space; and
after opening the host program of the target applet, displaying an entry page of the target applet, wherein the entry page comprises an icon of the target applet and an image of the virtual character pointing to the icon of the target applet.

19. The computer-implemented system of claim 15, wherein executing the service function corresponding to the guiding touch point in the target applet based on the operation performed by the user on the guiding touch point on the guiding page comprises:

displaying a first page of the target applet corresponding to the guiding touch point based on the operation performed by the user on the guiding touch point on the guiding page; or invoking a component in an electronic device based on the operation performed by the user on the guiding touch point on the guiding page, and executing the service function corresponding to the guiding touch point in the target applet.

20. The computer-implemented system of claim 15, wherein the guiding page further comprises a stop playing icon, and wherein the one or more operations further comprise, after opening the guiding page loaded on the function page and playing the guiding video on the guiding page:

detecting a video stopping operation performed by the user on the stop playing icon on the guiding page; and stopping the guiding video from playing in response to the video stopping operation performed by the user on the stop playing icon on the guiding page.

* * * * *